(12) United States Patent
Jorgovanovic

(10) Patent No.: US 10,305,951 B1
(45) Date of Patent: May 28, 2019

(54) DYNAMIC CLIENT ROUTING FOR VIDEO STREAMING CLIENTS

(71) Applicant: Amazon Technologies, Inc., Seattle, WA (US)

(72) Inventor: Milos Jorgovanovic, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 33 days.

(21) Appl. No.: 15/468,720

(22) Filed: Mar. 24, 2017

Related U.S. Application Data

(63) Continuation-in-part of application No. 15/164,161, filed on May 25, 2016, now Pat. No. 10,064,184.

(51) Int. Cl.
*H04L 29/06* (2006.01)
*H04W 72/04* (2009.01)

(52) U.S. Cl.
CPC ..... *H04L 65/4084* (2013.01); *H04W 72/0453* (2013.01)

(58) Field of Classification Search
CPC .......... H04L 65/4084; H04W 72/0453; H04N 21/00; H04N 21/23418; H04N 21/2381; H04N 21/26216; H04N 21/40
See application file for complete search history.

(56) References Cited

U.S. PATENT DOCUMENTS

| | | | | |
|---|---|---|---|---|
| 2006/0193292 A1* | 8/2006 | Bansal | ................. | H04W 76/14 370/331 |
| 2010/0081381 A1* | 4/2010 | Rofougaran | ............ | H04B 7/12 455/41.2 |
| 2012/0274859 A1* | 11/2012 | Knutson | ................. | H04L 12/66 348/723 |
| 2014/0053213 A1* | 2/2014 | Ueda | ................... | H04N 21/4122 725/60 |
| 2014/0254349 A1* | 9/2014 | Jia | ......................... | H04W 28/04 370/225 |
| 2015/0181487 A1* | 6/2015 | Konrad | ................. | H04W 76/14 370/329 |
| 2016/0163224 A1* | 6/2016 | Rauhala | ............... | G09B 19/003 434/257 |
| 2017/0332134 A1* | 11/2017 | Iwami | ................. | H04N 21/436 |

* cited by examiner

*Primary Examiner* — Andrew Lai
*Assistant Examiner* — Chuong M Nguyen
(74) *Attorney, Agent, or Firm* — Pierce Atwood LLP

(57) ABSTRACT

Devices, systems and methods are disclosed for allowing a media device to select a preferred configuration and send instructions to a remote device to connect to the media device using the preferred configuration. For example, the media device may choose between a direct configuration (e.g., media device communicates with the remote device directly via a first wireless network associated with the media device) or an indirect configuration (e.g., media device communicates with the remote device via a second wireless network associated with an external access point). The media device may select the preferred configuration based on data rates and/or airtime values determined based on the first wireless network and the second wireless network. Prior to connecting using the preferred configuration, the remote device may determine a frequency channel corresponding to the preferred configuration and may instruct a remote control to connect to the remote device using the frequency channel.

20 Claims, 16 Drawing Sheets

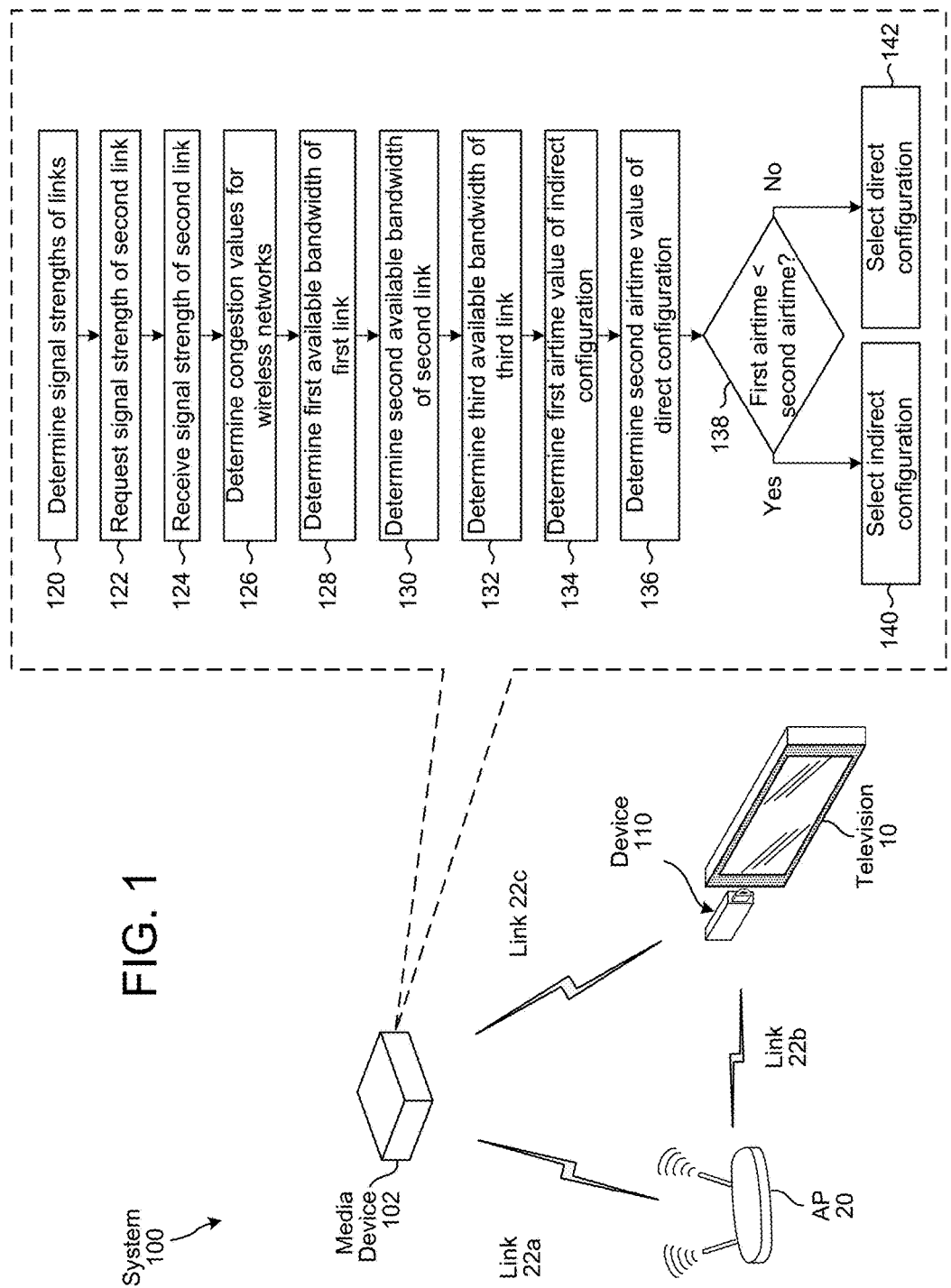

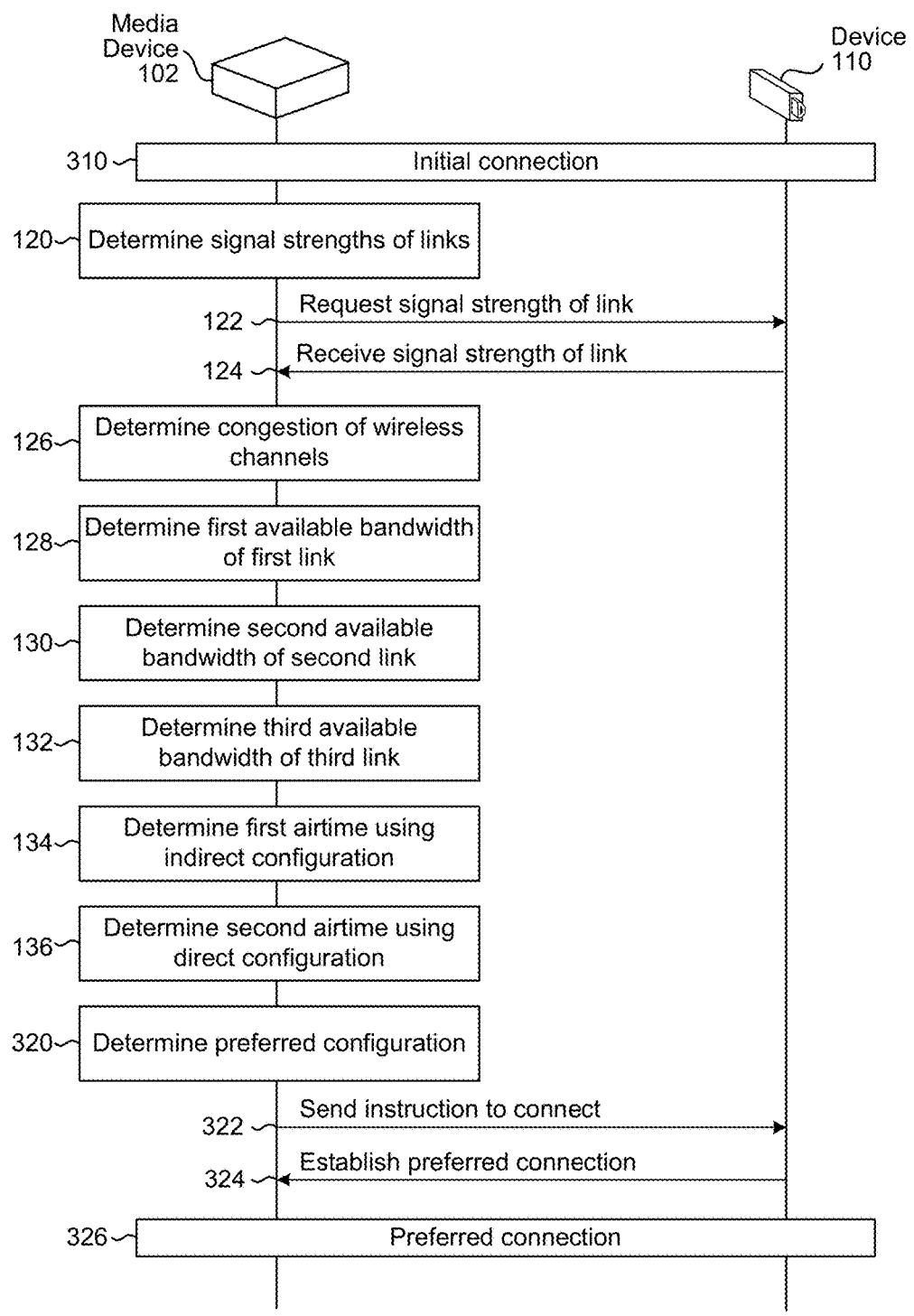

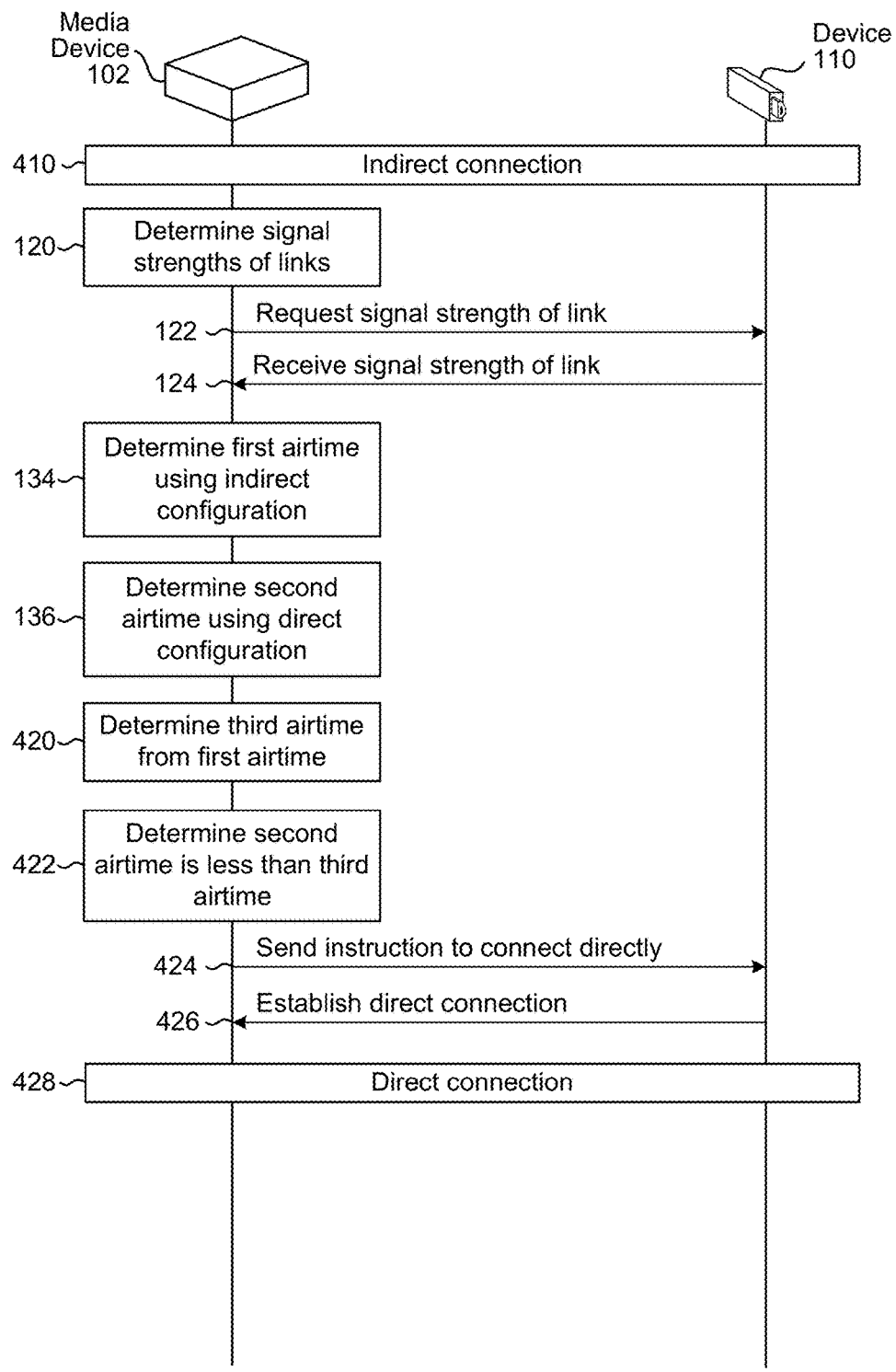

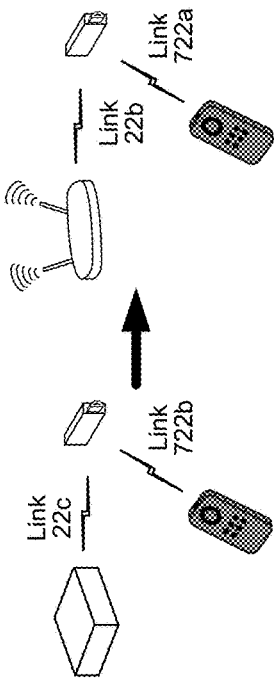
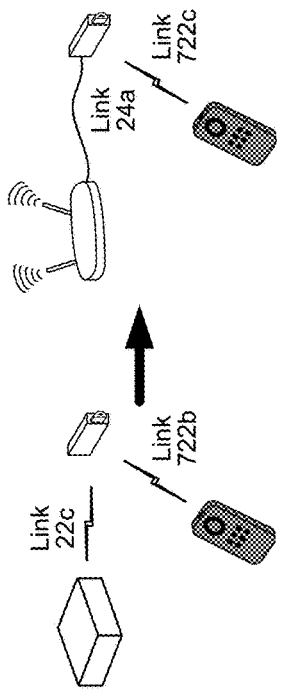
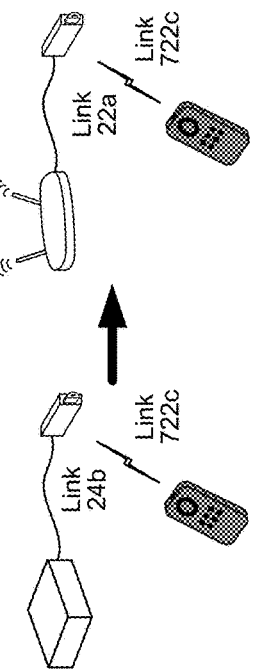
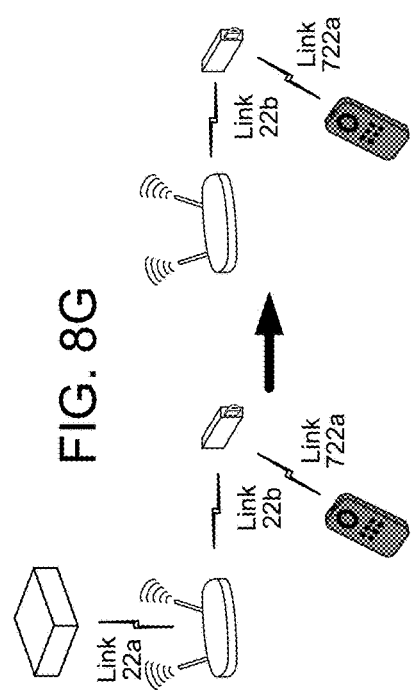
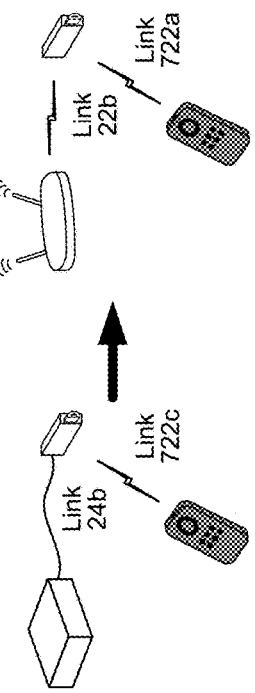

DYNAMIC CLIENT ROUTING FOR VIDEO STREAMING CLIENTS

CROSS-REFERENCE TO RELATED APPLICATION DATA

This application is a continuation-in-part of, and claims priority to U.S. Utility patent application Ser. No. 15/164,161, entitled "Dynamic Client Routing For Video Streaming Clients," filed on May 25, 2016, in the names of Milos Jorgovanovic. The above utility application is herein incorporated by reference in its entirety.

BACKGROUND

With the advancement of technology, the use and popularity of electronic devices has increased considerably. Electronic devices are commonly used to wirelessly connect to networks using network devices such as access points.

BRIEF DESCRIPTION OF DRAWINGS

For a more complete understanding of the present disclosure, reference is now made to the following description taken in conjunction with the accompanying drawings.

FIG. 1 illustrates a system for communicating between devices using multiple networks according to embodiments of the present disclosure.

FIG. 3 is a communication diagram that illustrates establishing a preferred connection according to embodiments of the present disclosure.

FIGS. 4A-4B are communication diagrams that illustrate modifying a preferred connection according to embodiments of the present disclosure.

FIGS. 8A-8K illustrate examples of instructing the remote control to change communication links according to embodiments of the present disclosure.

DETAILED DESCRIPTION

Electronic devices are commonly used to connect to wireless networks using network devices such as access points. For example, a remote device may connect to a first wireless network associated with an access point and may stream video data from a media device that is also connected to the first wireless network. Due to multiple devices being connected to the first wireless network, resulting in congestion, and/or due to network characteristics associated with the first wireless network (e.g., a 2.4 GHz frequency band may have a lower data rate than a 5 GHz frequency band), a data rate between the remote device and the media device may be low and negatively impact a user experience.

To increase the data rate between the remote device and the media device and therefore improve the user experience, devices, systems and methods are disclosed that provide a second wireless network associated with the media device and dynamically instructs the remote device to connect to the media device via the first wireless network or the second wireless network based on data rates available. For example, the media device may monitor the first wireless network and the second wireless network to determine an amount of congestion associated with the first wireless network and/or the second wireless network, may determine signal strengths between the media device, the access point and the remote device and may determine data rates (e.g., MB/s) and/or airtime values (e.g., length of time to send a MB of data) associated with the first wireless network and the second wireless network.

FIG. 1 illustrates an overview of a system 100 for implementing embodiments of the disclosure. The system 100 includes a media device 102, a network device such as an access point (AP) 20, a device 110 and a television 10. The device 110 may stream video data from the media device 102 and may send the video data to the television 10 to be displayed.

Figure 2A:
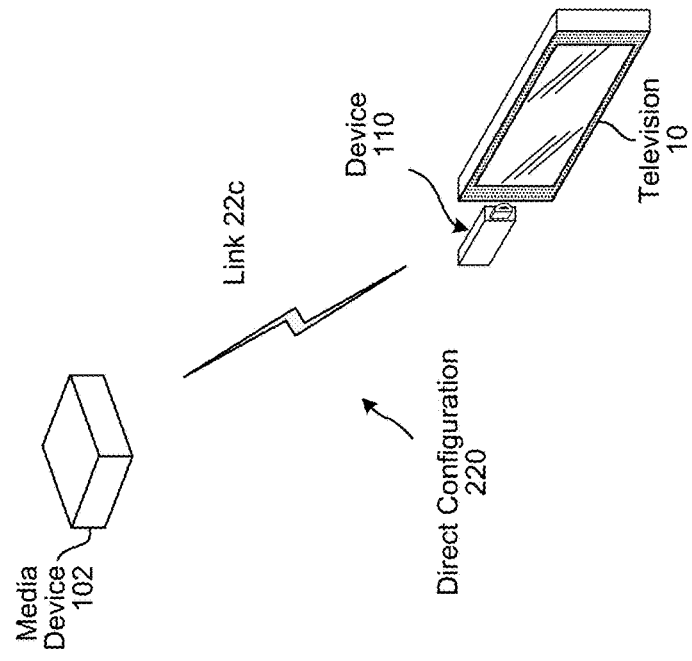
FIGS. 2A-2B illustrate configurations for communicating between devices according to embodiments of the present disclosure.
Figure 2B:
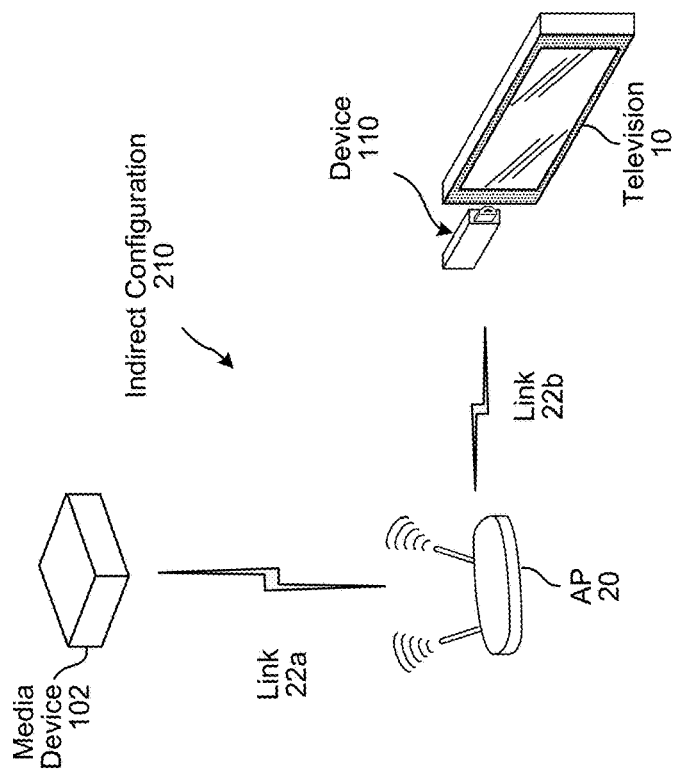

A connection between two devices may be referred to as a communication link. Thus, the media device 102 may be connected with the AP 20 via a first communication link 22a, the AP 20 may be connected with the device 110 via a second communication link 22b and the media device 102 may be connected with the device 110 via a third communication link 22c. As illustrated in FIGS. 2A-2B, the media device 102 may communicate with the device 110 indirectly using an indirect configuration 210 (e.g., via the first communication link 22a and the second communication link 22b) or directly using a direct configuration 220 (e.g., via the third communication link 22c).

The media device 102 may have access point capability and may generate a first wireless network. Thus, the device 110 may communicate directly with the media device 102 via the third communication link 22c by connecting to the first wireless network. The AP 20 may generate a second wireless network. Thus, the media device 102 and the device 110 may communicate via the second communication link 22b and the third communication link 22c when both the media device 102 and the device 110 are connected to the second wireless network.

In some examples, the first wireless network may be associated with a first frequency (e.g., a 5 GHz frequency band) and the second wireless network may be associated with a second frequency (e.g., a 2.4 GHz frequency band). However, the disclosure is not limited thereto and the first wireless network and/or the second wireless network may be associated with the first frequency and/or the second frequency without departing from the present disclosure. Additionally or alternatively, the media device 102 and/or the AP 20 may have dual band capability, enabling the media device 102 and/or the AP 20 to generate a wireless network associated with the first frequency and a wireless network associated with the second frequency. While the examples above mention 2.4 GHz/5 GHz frequency bands, the present disclosure is not limited thereto and the frequency bands may vary.

If the first wireless network is associated with the first frequency and the second wireless network is associated with the second frequency, the first wireless network and the second wireless network may have different network characteristics. For example, the 5 GHz frequency band may offer higher data rates and less congestion (e.g., more open channels) compared to the 2.4 GHz frequency band, but the 2.4 GHz frequency band may offer an extended range compared to the 5 GHz frequency band. Additionally or alternatively, due to additional devices connected to the second wireless network, the first wireless network may offer less congestion than the second wireless network.

In order to improve latency and video resolutions associated with sending video data from the media device 102 to the device 110, the media device 102 may determine data rates (e.g., MB/s) and/or airtime values (e.g., length of time to send a MB of data) associated with the indirect configuration 210 (e.g., first communication link 22a and second communication link 22b) and the direct configuration 220 (e.g., third communication link 22c). Based on the data rates and/or airtime values, the media device 102 may select a preferred configuration and may instruct the device 110 to connect to the media device 102 using the preferred configuration. For example, if the direct configuration 220 offers faster data rates/lower airtime values, the media device 102 may select the direct configuration 220 and instruct the device 110 to connect to the first wireless network and stream the video data via the third communication link 22c. Thus, if the media device 102 is communicating with the device 110 using the direct configuration 220, the device 110 will begin streaming the video data (e.g., request that the media device 102 send the video data), whereas if the media device 102 is communicating with the device 110 using the indirect configuration 210, the device 110 will connect to the first wireless network prior to streaming the video data. As used herein, streaming video data refers to the device 110 requesting that the media device 102 send video data, the media device 102 sending the video data to the device 110 and the device 110 receiving the video data in order to display the video data on a display coupled to the device 110.

In order to determine the data rates and/or airtime values, the media device 102 may determine signal strengths associated with the first communication link 22a, the second communication link 22b and the third communication link 22c. For example, the media device 102 may measure a first received signal strength indication (RSSI) value of a signal from the AP 20 (e.g., first signal strength associated with the first communication link 22a) and measure a third RSSI value of a signal from the device 110 (e.g., a third signal strength associated with the third communication link 22c). However, the media device 102 is unable to measure a second RSSI value of a signal from the AP 20 as received by the device 110 (e.g., a second signal strength associated with the second communication link 22b). Instead, the media device 102 may send a request to the device 110 instructing the device 110 to send the second RSSI value to the media device 102.

While FIG. 1 illustrates the first communication link 22a, the second communication link 22b and the third communication link 22c as wireless communication links, the disclosure is not limited thereto. In some examples, one or more communication links may be wired communication links. For example, the device 110 may be connected to the AP 20 and/or the media device 102 via a wired communication link and/or the media device 102 may be connected to the AP 20 via a wired communication link. In order to determine the data rates and/or airtime values, the media device 102 may set a signal strength associated with the wired communication link to a default maximum value or the like. For example, the media device 102 may consider the wired communication links to be excellent communication links corresponding to a default maximum RSSI value.

As illustrated in FIG. 1, the media device 102 may determine (120) signal strengths (e.g., RSSI, SNR or the like) corresponding to links (e.g., first communication link 22a and third communication link 22c), may request (122) a signal strength corresponding to the second communication link from the device 110 and may receive (124) the signal strength corresponding to the second communication link from the device 110. The media device 102 may determine (126) congestion values for wireless networks, such as a first congestion value corresponding to first congestion on the first wireless network and a second congestion value corresponding to second congestion on the second wireless network. As will be described in greater detail below with regard to FIGS. 5-6, the media device 102 may determine the first congestion value by determining a percentage of unsuccessful channel access attempts to a total number of channel access attempts associated with the first wireless network. For example, the media device 102 may track the status of a clear channel assessment (CCA) register, which may store a CCA value indicating how many channel access attempts were unsuccessful compared to a total number of channel access attempts. If the first wireless network is less congested (e.g., lower congestion value) than the second wireless network, more data packets may be sent and received using the first wireless network in a fixed period of time, resulting in higher data rates and lower airtime values.

The media device 102 and the device 110 do not need to be connected to a wireless network to determine a signal strength value associated with a communication link. For example, the media device 102 may determine the first signal strength value associated with the first communication link 22a even when not connected to the second wireless network. Similarly, the media device 102 may determine the third signal strength value associated with the third communication link 22c when the device 110 is not connected to the first wireless network, and the device 110 may determine the second signal strength value associated with the second communication link 22b when the device 110 is not connected to the second wireless network. Further, the media device 102 may determine the second congestion value associated with the second wireless network even when not connected to the second wireless network. In some examples, the media device 102 may be connected to the second wireless network associated with the AP 10 while the device 110 is connected to the first wireless network associated with the media device 102.

The media device 102 may determine (128) a first available bandwidth of the first communication link 22a. For example, the media device 102 may multiply a first expected throughput (e.g., ideal throughput with no congestion under ideal circumstances) associated with the first communication link 22a by a first scaling factor (e.g., one minus the second congestion value associated with the second wireless network) to determine the first available bandwidth. The media device 102 may determine (130) a second available bandwidth of the second communication link 22b based on a second expected throughput associated with the second communication link and the first scaling factor. The media device 102 may determine (132) a third available bandwidth of the third communication link 22c. For example, the media device 102 may multiply a third expected throughput associated with the third communication link 22c by a second scaling factor (e.g., one minus the first congestion value associated with the first wireless network) to determine the third available bandwidth.

After determining the first available bandwidth, the second available bandwidth and the third available bandwidth, the media device 102 may determine (134) a first airtime value of the indirect configuration 210. For example, the media device 102 may sum a first reciprocal of the first available bandwidth and a second reciprocal of the second available bandwidth to determine the first airtime value. The media device 102 may determine (136) a second airtime value of the direct configuration 220. For example, the media device 102 may sum a third reciprocal of the third available bandwidth to determine the second airtime value. The media device 102 may determine (138) if the first airtime value is less than the second airtime value. If the first airtime value is lower, the media device 102 may select the indirect configuration 210 and send an instruction to the device 110 to connect to the media device 102 via the indirect configuration 210. If the first airtime value is not lower, the media device 102 may select the direct configuration 220 and send an instruction to the device 110 to connect to the media device 102 via the direct configuration 220.

While the flowchart illustrated in FIG. 1 refers to comparing the first airtime value to the second airtime value, the disclosure is not limited thereto. Instead, the media device 102 may compare a first data rate associated with the indirect configuration 210 to a second data rate associated with the direct configuration 220 without departing from the present disclosure.

Prior to the media device 102 selecting a preferred configuration, the media device 102 may communicate to the device 110 using either the indirect configuration 210 or the direct configuration 220. For example, the media device 102 and the device 110 may initially connect to the second wireless network associated with the AP 10, enabling the media device 102 to communicate with the device 110 to request the second signal strength value associated with the second communication link 22b and send an instruction to the device 110 to stream video data from the media device 102 using the preferred configuration. If the media device 102 selects the indirect configuration 210 as the preferred configuration, the device 110 may remain connected to the second wireless network and may send a request to the media device 102 to stream the video data. If the media device 102 selects the direct configuration 220 as the preferred configuration, the device 110 may connect to the first wireless network prior to sending the request to the media device 102 to stream the video data.

Additionally or alternatively, the device 110 may initially connect to the first wireless network associated with the media device 102, enabling the media device 102 to communicate directly with the device 110. If the media device 102 selects the direct configuration 220 as the preferred configuration, the device 110 may remain connected to the first wireless network and may send a request to the media device 102 to stream the video data. If the media device 102 selects the indirect configuration 210 as the preferred configuration, the device 110 may connect to the second wireless network prior to sending the request to the media device 102 to stream the video data.

To illustrate an example, the device 110 may connect to the second wireless network associated with the AP10 in order to stream remote content, such as television shows, movies or the like, from media servers online. When the device 110 wants to access local content stored on the media device 102, the device 110 may disconnect from the second wireless network and connect directly to the media device 102 via the first wireless network. In some situations, the media device 102 may determine that the indirect configuration 210 is preferable to the direct configuration 220 and may instruct the device 110 to connect to the media device 102 via the second wireless network. The media device 102 may then stream the local content to the device 110 using the indirect configuration 210.

FIG. 3 is a communication diagram that illustrates establishing a preferred connection according to embodiments of the present disclosure. As illustrated in FIG. 3, the media device 102 may initially communicate with the device 110 using an initial connection illustrated in step 310. For example, the device 110 may determine to access local content stored on the media device 102 and may connect directly to the media device 102. The media device 102 may perform steps 120-136, as described above with regard to FIG. 1, and may determine (320) a preferred configuration. For example, the media device 102 may determine that the preferred configuration is the indirect configuration 210 (e.g., the first airtime is lower than the second airtime) or the direct configuration 220 (e.g., the second airtime is lower than the first airtime). The media device 102 may send (322) an instruction to the device 110 instructing the device 110 to connect to the media device 102 using a preferred connection. For example, if the preferred configuration is the indirect configuration 210, the preferred connection is via the first communication link 22a and the second communication link 22b. If the preferred configuration is the direct configuration 220, the preferred connection is via the third communication link 22c. In response to the instruction, the device 110 may establish (324) the preferred connection and the media device 102 may communicate with the device 110 using the preferred connection illustrated in step 326.

Figure 4B:
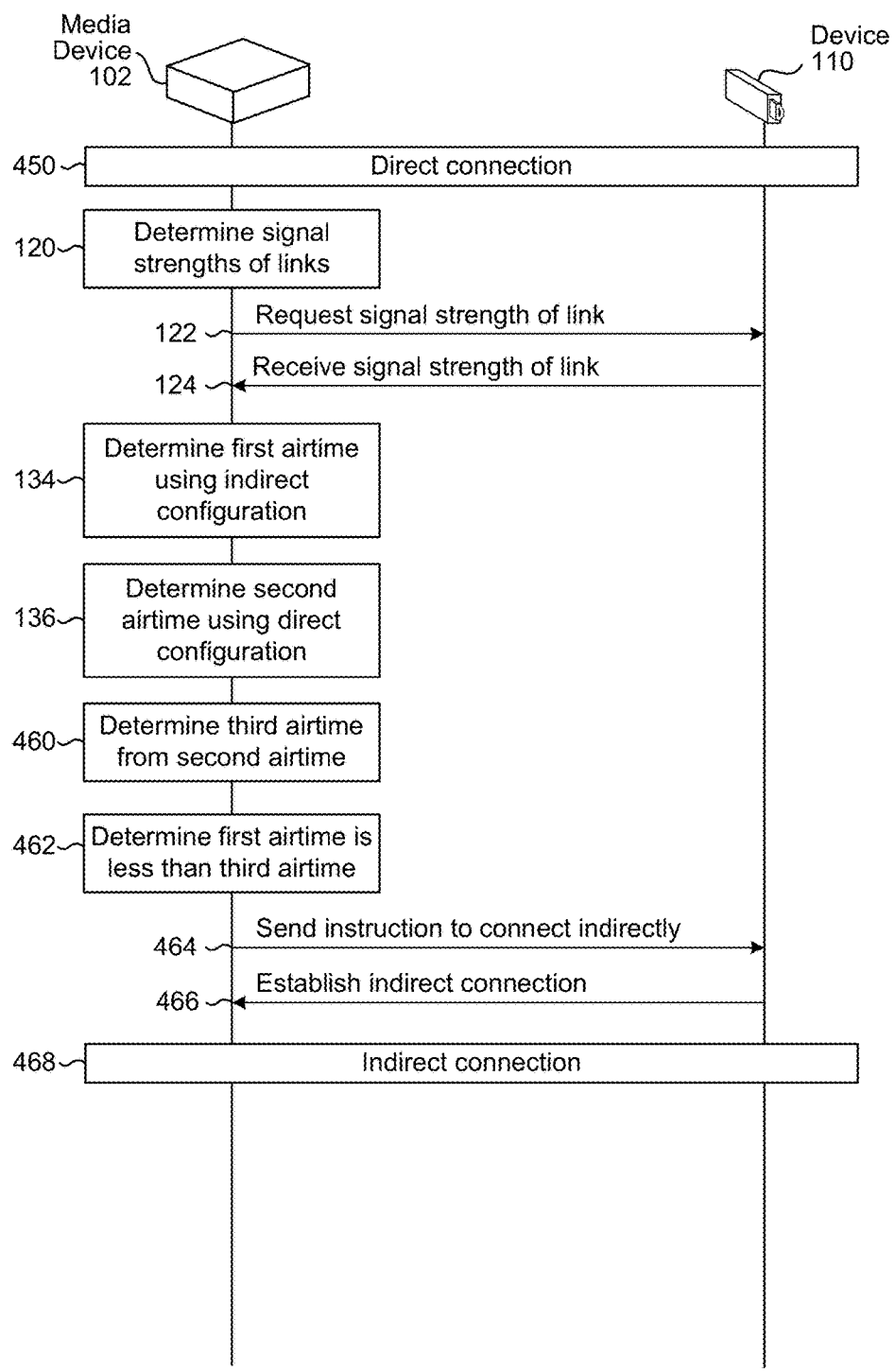

FIGS. 4A-4B are communication diagrams that illustrate modifying a preferred connection according to embodiments of the present disclosure. As illustrated in FIG. 4A, the media device 102 may communicate with the device 110 using an indirect connection in step 410. The media device 102 may perform steps 120-136, as described above with regard to FIG. 1, to determine the first airtime value associated with the indirect configuration and the second airtime value associated with the direct configuration. To prevent the media device 102 from switching back and forth between the indirect configuration and the direct configuration, once the media device 102 has selected a preferred configuration the media device 102 may take into account a threshold value to provide hysteresis. As illustrated in FIG. 4A, the media device 102 may determine (420) a third airtime value from the first airtime value, such as by subtracting the threshold value from the first airtime value. Thus, the second airtime value must be lower than the first airtime value by more than the threshold value in order for the media device 102 to switch from the indirect configuration to the direct configuration. While the second airtime value is above the third airtime value, the media device 102 may maintain the indirect configuration.

However, if the second airtime value becomes lower than the third airtime value, the media device 102 may determine (422) that the second airtime value is less than the third airtime value, may send (424) an instruction to the device 110 instructing the device 110 to connect to the media device 102 directly, the device 110 may establish (426) a direct connection via the third communication link 22c and the media device 102 may communicate with the device 102 via the third communication link 22c, as illustrated in step 428.

As illustrated in FIG. 4B, the media device 102 may communicate with the device 110 using a direct connection in step 450. The media device 102 may perform steps 120-136, as described above with regard to FIG. 1, to determine the first airtime value associated with the indirect configuration and the second airtime value associated with the direct configuration. To prevent the media device 102 from switching back and forth between the indirect configuration and the direct configuration, once the media device 102 has selected a preferred configuration the media device 102 may take into account a threshold value to provide hysteresis. As illustrated in FIG. 4B, the media device 102 may determine (460) a third airtime value from the second airtime value, such as by subtracting the threshold value from the second airtime value. Thus, the first airtime value must be lower than the second airtime value by more than the threshold value in order for the media device 102 to switch from the direct configuration to the indirect configuration. While the first airtime value is above the third airtime value, the media device 102 may maintain the direct configuration.

However, if the first airtime value becomes lower than the third airtime value, the media device 102 may determine (462) that the first airtime value is less than the third airtime value, may send (464) an instruction to the device 110 instructing the device 110 to connect to the media device 102 indirectly, the device 110 may establish (466) an indirect connection via the first communication link 22a and the second communication link 22b, and the media device 102 may communicate with the device 102 via the first communication link 22a and the second communication link 22b, as illustrated in step 468.

Figure 5:
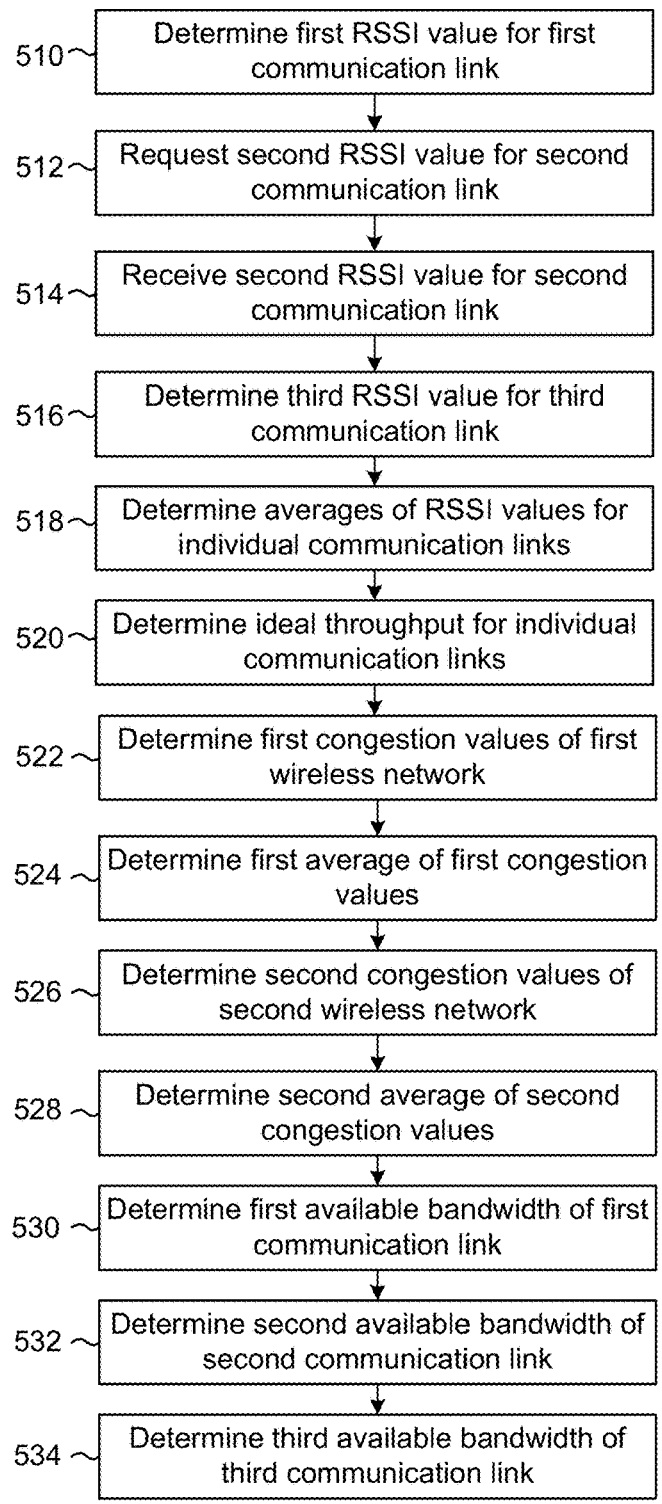
FIG. 5 is a flowchart conceptually illustrating an example method for determining available bandwidths according to embodiments of the present disclosure.

FIG. 5 is a flowchart conceptually illustrating an example method for determining available bandwidths according to embodiments of the present disclosure. As illustrated in FIG. 5, the media device 102 may determine (510) a first RSSI value for the first communication link 22a, may request (512) a second RSSI value for the second communication link 22b from the device 110, may receive (514) the second RSSI value for the second communication link 22b from the device 110 and may determine (516) a third RSSI value for the third communication link 22c.

In some examples, one or more communication links 22 may be wired communication links. For example, the device 110 may be connected to the AP 20 and/or the media device 102 via a wired communication link and/or the media device 102 may be connected to the AP 20 via a wired communication link. If a communication link 22 corresponds to a wired communication link, the media device 102 may set a signal strength value (e.g., RSSI value) to a default maximum value or the like. For example, the third communication link 22c may be a wired communication link between the device 110 and the media device 102 and the media device 102 may use a default maximum RSSI value for the third communication link in step 516.

The media device 102 may determine (518) averages of RSSI values for individual links. For example, the media device 102 may determine a first moving average of a first plurality of RSSI values associated with the first communication link 22a, a second moving average of a second plurality of RSSI values associated with the second communication link 22b and a third moving average of a third plurality of RSSI values associated with the third communication link 22c. The averages may include weighting factors, emphasizing more recent RSSI values or the like, using the following equation:

$$RSSI_n\_AVG = w_0 * RSSI_n[0] + w_1 * RSSI_n[1] + \ldots + w_K * RSSI_n[K] \quad [1]$$

where n=1, 2, 3 corresponding to the communication links, K is the number of RSSI measurements taken into consideration for the moving average, and $w_0$ to $w_K$ are the weighting factors.

The media device 102 may determine (520) an ideal throughput for the individual communication links 22a/22b/22c. In some examples, the media device 102 may determine the ideal throughput using a lookup table and the average RSSI values. For example, the average RSSI values can be translated to an approximate Transmission Control Protocol (TCP) throughput, which can be achieved in a clean environment (e.g., no congestion on a particular wireless channel). An example of a lookup table is provided in Table 1.

TABLE 1

Example of ideal throughputs

| RSSI (dBm) | TSP TH (Mb/s) |
|---|---|
| −50 | 100 |
| −60 | 100 |
| −70 | 70 |
| −80 | 20 |
| −85 | 5 |
| −90 | 1 |

In some examples, the lookup table may take into account the device 110 and its wireless capability. This lookup table could be generated based on measured range-vs-rate diagrams, data sheet specifications, etc., and may be stored on the media device 102 or accessed from a remote device by the media device 102. However, the disclosure is not limited thereto and the media device 102 may determine the ideal throughput without using a lookup table. For example, the media device 102 may use some signal quality metrics, such as modulation and coding scheme (MCS) index values, to determine the ideal throughput directly without using a lookup table, as the MCS index values may have a linear relationship with the ideal throughput.

The media device 102 may determine (520) first congestion values of the first wireless network, determine (524) a first average of the first congestion values, determine (526) second congestion values of the second wireless network and determine (528) a second average of the second congestion values. If the first wireless network is less congested (e.g., lower congestion value) than the second wireless network, more data packets may be sent and received using the first wireless network in a fixed period of time, resulting in higher data rates and lower airtime values using the first wireless network.

As an example, the congestion values may correspond to a clear channel assessment (CCA) value (which may be stored in a CCA register), which may indicate how many channel access attempts were unsuccessful compared to a total number of channel access attempts. For example, the device may attempt to access a channel to send a packet, but prior to sending the packet the device listens to the channel. If the channel has a current transmission (e.g., channel is busy because a different device is transmitting), the device waits to access the channel and this is referred to as an unsuccessful channel access. The device may increment both the CCA register and a cumulative register counting total channel access attempts by one. If the channel does not have a current transmission (e.g., channel is open), the device may send the packet and this is referred to as a successful channel access. The device does not increment the CCA register but increments the cumulative register by one.

To determine the congestion value, the device may periodically determine a status (e.g., a current value) of the CCA register and the cumulative register and calculate a ratio of unsuccessful channel access attempts to the total number of channel access attempts. As a simple example, a current value of the CCA register may be divided by a current value of the cumulative register, indicating a percentage of the time that the channel is busy. More commonly, however, the device may determine the number of unsuccessful/total channel access attempts over a period of time instead of using the current value stored in the registers. Thus, the device may periodically (e.g., every second) check the status of the registers and determine a difference for each register (e.g., current value minus previous value). For example, the device may determine a first value of the CCA register and a second value of the cumulative register at a first time and determine a third value of the CCA register and a fourth value of the cumulative register at a second time. To calculate the congestion value at the second time, the device may determine a first difference corresponding to the CCA register (e.g., third value minus first value) and a second difference corresponding to the cumulative register (e.g., fourth value minus second value) and divide the first difference by the second difference. For example, if 50 out of 100 channel access attempts are unsuccessful, the congestion value is 50%. The congestion value may be calculated as:

$$r_{CCA} = N_{CCA}/N_{total} \quad [2]$$

where $r_{CCA}$ is the congestion value, $N_{CCA}$ is the number of unsuccessful channel access attempts and $N_{total}$ is the total number of channel access attempts.

In some examples, the device may calculate a weighted moving average over a period of time. While the device checks the registers periodically (e.g., every second), the weighted moving average may take into account a longer period of time encompassing multiple counter values. For example, the device may determine the congestion value based on a number of unsuccessful channel access attempts and a number of total channel access attempts in the past ten seconds. Additionally or alternatively, the device may assign lower weights to the older counter values, such that the previous congestion values are factored into the current congestion value while emphasizing the most recent updates to the registers. For example, the device may place a first weight on a first time period and a second weight on a second time period. As an illustration, the device may calculate a first difference corresponding to the CCA register and a second difference corresponding to the cumulative register at a first time and calculate a third difference corresponding to the CCA register and a fourth difference corresponding to the cumulative register at a second time. To determine the congestion value, the device may assign first weights (e.g., 1) to the first difference and the second difference and assign second weights (e.g., 2) to the third difference and the fourth difference. Thus, the congestion value associated with the first time period is weighted half as much as the congestion value associated with the second time period. The weighted moving average may be calculated as:

$$r_{CCA\_AVG} = m_0 * r_{CCA}[0] + m_1 * r_{CCA}[1] + \ldots + m_K * r_{CCA}[L] \quad [3]$$

where $r_{CCA\_AVG}$ is the moving average of congestion values, L is the number of $r_{CCA}$ measurements taken into consideration for the moving average, and $m_0$ to $m_K$ are the weighting factors. The media device 102 may calculate a first moving average for the first wireless network and a second moving average for the second wireless network.

The media device 102 may determine (530) a first available bandwidth associated with the first communication link 22a, determine (532) a second available bandwidth associated with the second communication link 22b and determine (534) a third available bandwidth associated with the third communication link 22c. For example, the media device 102 may multiply the first ideal throughput (e.g., ideal throughput with no congestion under ideal circumstances) associated with the first communication link 22a by a first scaling factor (e.g., one minus the second average of the second congestion values associated with the second wireless network) to determine the first available bandwidth. Similarly, the media device 102 may multiply the second ideal throughput associated with the second communication link 22b and the first scaling factor to determine the second available bandwidth. The media device 102 may multiply a third ideal throughput associated with the third communication link 22c by a second scaling factor (e.g., one minus the first average of the first congestion values associated with the first wireless network) to determine the third available bandwidth. Thus, the available bandwidths correspond to expected throughputs under non-ideal circumstances. The media device 102 may determine available bandwidth using the following equation:

$$TH_{cong} = TH_{clean}(1 - r_{CCA\_AVG}) \quad [4]$$

where $TH_{cong}$ is the available bandwidth, $TH_{clean}$ is the ideal throughput for the communication link and $r_{CCA\_AVG}$ is the moving average of congestion values for the wireless network.

In some examples, the media device 102 may determine data rates and/or airtime values based on a signal quality metric such as RSSI, as illustrated in FIG. 5. However, the disclosure is not limited to using RSSI to determine the data rates and/or airtime values. Instead, other examples of signal quality metrics include metrics that indicate a transmission quality of a link between the media device 102, the device 110 and/or the AP 20. Not all signal quality metrics are supported by all access points, but the signal quality metrics may include modulation and coding scheme (MCS) index values, transmit (Tx) statistics or receive (Rx) statistics or may be derivable from the Tx/Rx statistics. For example, Tx statistics may include retries count, multiple retries count, TX frame count, TX frame queued count, TX byte count, TX byte queued count, TX rate, TX rate history, Receive Success Rate (RTS) fail count, RTS success count, Acknowledgment (ACK) fail count or the like, Rx statistics may include current RSSI values, an average RSSI value, RX frame count, RX duplicated frame count, RX cyclic redundancy check (CRC) error count, RX rate, RX rate history, SYNC fail count or the like, and derivable statistics may include Packet Error Rate (PER), Bit Error Rate (BER), Signal to Noise Ratio (SNR) or the like. Several of the signal quality metrics listed above are associated with errors that occur when the media device 102 transmits a packet and the AP 20 does not receive the packet. As the AP 20 does not receive the packet, the media device 102 must retransmit the packet until the AP 20 receives the packet. Therefore, while a data rate between the media device 102 and the AP 20 may be high, a high number of errors (e.g., high error rate such as PER, BER, etc.) requires redundant transmissions of packets, resulting in a lower actual throughput of unique packets.

The media device 102 may determine (e.g., measure) some of the signal quality metrics without being directly linked to the device 110 and/or the AP 20. For example, the media device 102 may determine an RSSI value associated with a potential communication link (e.g., link 22c) between the media device 102 and the device 110 even when the media device 102 is not directly linked to the device 110 (e.g., the device 110 is not connected to the first wireless network). However, other signal quality metrics, such as the MCS index values, Tx statistics, and/or Rx statistics, may require that the media device 102 be directly linked to the device 110. As used herein, a "communication link" may refer to a potential communication link between the media device 102, the device 110 and/or the AP 20, even when data is not being sent using the communication link. For example, the media device 102 may be referred to as being connected to the device 110 via a communication link (e.g., link 22c) when the communication link is being used to send data between the media device 102 and the device 110 (e.g., when the device 110 is connected to the media device 102 via the first wireless network). In contrast, the media device 102 is not connected to the device 110 via the communication link (e.g., link 22c) when the communication link is not being used to send data (e.g., when the media device 102 measures an RSSI value prior to the device 110 connecting to the first wireless network).

In some examples, the media device 102 may determine data rates and/or airtime values based on measured data rates and/or measured airtime values. Thus, the media device 102 does not determine a preferred configuration solely based on signal strength data (e.g., current RSSI values, an average RSSI value, Signal to Noise Ratio (SNR) or the like), but instead determines the preferred configuration based on actual data rates, such as throughput rates or a physical layer (PHY) data rate determined using signal quality metrics.

In some examples, the media device 102 may determine data rates and/or airtime values based on a packet error rate (PER) value. While the PER value does not indicate to the media device 102 data rates/airtime values associated with other devices or potential data rates/airtime values that the other devices are capable of transmitting, the PER value may be used to determine how successful the media device 102 is in sending and receiving data using a communication link. For example, a low PER value corresponds to the media device 102 sending and receiving packets with few errors, whereas a higher PER value corresponds to the media device 102 sending and receiving packets with many errors and therefore having to re-transmit packets that were not received. Thus, a first communication link that has a fast data rate but high PER value may actually send less data than a second communication link that has a slower data rate but low PER value, as the first communication link has to repeatedly retransmit packets that were not received. The media device 102 may determine the available bandwidth using the following equation:

$$TH_{cong} = TH_{clean}(1+PER) \quad [5]$$

In some examples, prior to selecting the preferred configuration, the device 102 may determine an estimated data rate (e.g., expected throughput) based on assumptions associated with the hardware capabilities of the AP 20, the media device 102 and/or the device 110. After selecting the preferred configuration and establishing the preferred connection between the media device 102 and the device 110, the media device 102 may replace the estimated data rate with an actual data rate (e.g., actual throughput) determined based on data rates measured by the media device 102.

In some examples, in order to determine an actual data rate (e.g., actual throughput), the media device 102 may transmit packets to the AP 20, may receive an acknowledgment for received packets, may determine a first number of packets transmitted to the AP 20 and may determine a second number of packets received by the AP 20. For example, the media device 102 may transmit a first packet and a second packet to the AP 20 and receive an acknowledgement from the AP 20 that the first packet was received. As the media device 102 did not receive an acknowledgment from the AP 20 that the second packet was received, the media device 102 may determine that the first number of transmitted packets was two and the second number of received packets was one. The media device 102 may then determine a data rate using the first number of transmitted packets and the second number of received packets. For example, the media device 102 may use first signal quality metrics (e.g., TX frame count, TX rate, TX rate history or the like) available to the media device 102 to determine the first number of packets, may use second signal quality metrics (e.g., RX frame count, RX rate, RX rate history or the like) received from the AP 20 to determine the second number of packets, and may determine the data rate using the first signal quality metrics and the second signal quality metrics. The data rate may be the physical layer rate (PHY rate), which is the maximum data rate at which the media device 102 may communicate with the AP 20, or may be the throughput rate, which is the actual data rate at which the media device 102 communicates with the AP 20, although the disclosure is not limited thereto and the data rate may be application layer rate or the like without departing from the disclosure.

In some examples, the device 102 may determine the expected throughput (e.g., estimated data rate supported by both the media device 102 and the AP 20) and/or the actual throughput (e.g., actual data rate transmitted between the media device 102 and the AP 20) of the first communication link 22a. For example, prior to establishing the first communication link 22a, the media device 102 may determine an estimated data rate (e.g., expected throughput) based on assumptions associated with the hardware capabilities of the AP 20 and the media device 102, a RSSI or the like. After establishing the first communication link 22a, the media device 102 may replace the estimated data rate with an actual data rate (e.g., actual throughput) determined based on data rates measured by the device 102. Additionally or alternatively, the media device 102 may determine the expected throughput and/or the actual throughput associated with the second communication link 22b (between the AP 20 and the device 110) and/or the third communication link 22c (between the media device 102 and the device 110) using similar techniques.

In some examples, the media device 102 may determine a maximum supported data rate (PHYRate_Max) per channel of the second wireless network. For example, the media device 102 may determine the maximum supported data rate using a lookup table based on characteristics of the AP 20, such as a channel width and guard interval. An example of a lookup table is provided in Table 2.

TABLE 2

Example of 11ac PHY Rates for a Single Spatial Stream

| | | | 20 MHz channels | | 40 MHz channels | | 80 MHz channels | | 160 MHz | |
|---|---|---|---|---|---|---|---|---|---|---|
| MCS | Modulation Type | Coding rate | 800 ns GI | 400 ns GI | 800 ns GI | 400 ns GI | 800 ns GI | 400 ns GI | 800 ns GI | 400 ns GI |
| 0 | BPSK | 1/2 | 6.5 | 7.2 | 13.5 | 15 | 29.3 | 32.5 | 58.5 | 65 |
| 1 | QPSK | 1/2 | 13 | 14.4 | 27 | 30 | 58.5 | 65 | 117 | 130 |
| 2 | QPSK | 3/4 | 19.5 | 21.7 | 40.5 | 45 | 87.8 | 97.5 | 175.5 | 195 |
| 3 | 16-QAM | 1/2 | 26 | 28.9 | 54 | 60 | 117 | 130 | 234 | 260 |
| 4 | 16-QAM | 3/4 | 39 | 43.3 | 81 | 90 | 175.5 | 195 | 351 | 390 |
| 5 | 64-QAM | 2/3 | 52 | 57.8 | 108 | 120 | 234 | 260 | 468 | 520 |
| 6 | 64-QAM | 3/4 | 58.5 | 65 | 121.5 | 135 | 263.3 | 292.5 | 526.5 | 585 |
| 7 | 64-QAM | 5/6 | 65 | 72.2 | 135 | 150 | 292.5 | 325 | 585 | 650 |
| 8 | 256-QAM | 3/4 | 78 | 86.7 | 162 | 180 | 351 | 390 | 702 | 780 |
| 9 | 256-QAM | 5/6 | N/A | N/A | 180 | 200 | 390 | 433.3 | 780 | 866.7 |

In some examples, the media device 102 may determine a first number of channels supported by the AP 20, may determine a second number of channels supported by the media device 102 and may determine a stream number (SS_Num) as the lower of the first number and the second number. For example, the media device 102 may receive a first channel number indicating a maximum number of channels supported by the AP 20 from the AP 20, may determine a second channel number indicating a maximum number of channels supported by the media device 102 and may take the lower of the first channel number and the second channel number as the stream number, indicating the number of channels that will be used between the media device 102 and the AP 20.

In some examples, the device 102 may determine a signal strength value (e.g., RSSI value) associated with the first communication link 22a and may determine a scaling factor (RSSILvlFactor) using the signal strength. For example, the scaling factor (RSSILvlFactor) may scale the advertised data rate (PHYRate_Max) to a more realistic value using a lookup table. An example of a lookup table is provided in Table 3.

TABLE 3

Example of scaling factors

| RSSI Level | Range (dBm) | Scaling Factor |
|---|---|---|
| High | >=−60 dBm | 0.7 |
| Medium | −60 dBm to −70 dBm | 0.6 |
| Low | <=−70 dBm | 0.5 |

The media device 102 may then determine an expected throughput (Exp_Thrpt). For example, the media device 102 may determine the expected throughput using the maximum supported data rate (PHYRate_Max), the stream number (SS_Num) and the scaling factor (RSSILvlFactor) using equation 6:

$$Exp\_Thrpt = RSSILvlFactor * PhyRate\_Max * SS\_N \quad [6]$$

After the initial connection, the expected throughput may be updated periodically using an actual throughput. For example, the device 102 may determine how many packets are transmitted and the data rate associated with each of the transmitted packets. Thus, the media device 102 may determine the actual throughput per spatial stream (e.g., channel) and determine the actual throughput using equation 7.

$$Act\_Thrpt\_SS = (\Sigma PhyRate\_n * NumPck\_n) / NumPck\_total \quad (2)$$

$$Act\_Thrpt = \Sigma Act\_Thrpt\_SS\_n \quad [7]$$

The device 102 may determine a data rate (PhyRate_n) associated with a group of packets and may determine a product by multiplying the data rate by the number of packets (NumPck_n) in the group. The media device 102 may then determine if the media device 102 transmitted additional packets and may repeat the previous steps for the additional packets. If the media device 102 determines that there are no additional packets, the media device 102 may determine a sum of the products. For example, the media device 102 may determine a first number of packets transmitted at a first data rate and a second number of packets transmitted at a second data rate. The media device 102 may multiply the first number of packets by the first data rate to generate a first product and multiply the second number of packets by the second data rate to generate a second product. The media device 102 may then sum the first product and the second product.

The media device 102 may determine a total number of packets transmitted (NumPck_total). For example, the media device 102 may sum the first number of packets and the second number of packets. The media device 102 may then determine an actual throughput (Act_Thrpt). For example, the media device 102 may determine the actual throughput per spatial stream (Act_Thrpt_SS) using the scaling factor (RSSILvlFactor), the individual data rates (PhyRate_n), the individual number of packets (NumPck_n) and the total number of packets transmitted (NumPck_total) and equation 7. The media device 102 may then determine the actual throughput by summing the actual throughput per spatial stream for each spatial stream.

In some examples, the media device 102 may perform steps 510-534 to determine the preferred configuration when the device 110 initially determines to connect to the media device 102. For example, when the device 110 receives a command to stream video data from the media device 102, the media device 102 may perform the steps illustrated in FIG. 5 and may determine the preferred configuration. However, the disclosure is not limited thereto and the media device 102 may perform the steps illustrated in FIG. 5 periodically and may update the preferred configuration. In some examples, the media device 102 may determine the preferred configuration at a fixed interval (e.g., every 5-10 minutes), although the disclosure is not limited thereto and the media device 102 may determine the preferred configuration at variable intervals without departing from the disclosure. For example, the media device 102 may monitor a throughput associated with the current configuration and/or a resolution associated with the streaming video data and may determine if the throughput is below a first threshold value and/or if the resolution is below a second threshold value. When the throughput is below the first threshold value and/or the resolution is below the second threshold value, the media device 102 may perform the steps illustrated in FIG. 5 to update the preferred configuration and may send an instruction to the device 110 to maintain the current configuration or to change to a new configuration.

Additionally or alternatively, the media device 102 may determine the preferred configuration based on an instruction received from the device 110. For example, the device 110 may determine that a throughput associated with the current configuration is below a first threshold value and/or a resolution associated with the streaming video data is below a second threshold value and may request the media device 102 to perform the steps illustrated in FIG. 5 to determine a preferred configuration based on current network characteristics. The media device 102 may perform the steps illustrated in FIG. 5 to determine the preferred configuration and may send an instruction to the device 110 to maintain the current configuration or to change to a new configuration.

In some examples, the media device 102 may perform hysteresis in order to give deference to a current configuration and prevent unnecessary configuration changes that may disrupt a viewing experience of the user. For example, when the media device 102 initially determines the preferred configuration (e.g., prior to the device 110 receiving the streaming video data from the media device 102), the media device 102 may determine the preferred configuration based on actual available bandwidths, airtime values, data rates and/or the like (e.g., no threshold value). To illustrate an example, the media device 102 may compare a first airtime value to a second airtime value and select whichever airtime value is lower.

When the device 110 is already connected to the media device 102 (e.g., streaming video data from the media device 102), the media device 102 may determine the preferred configuration based on available bandwidths, airtime values, data rates and/or the like modified using a threshold value. For example, if the first airtime value corresponds to a current configuration, the media device 102 may determine a third airtime value by adding the threshold value to the second airtime value and may compare the first airtime value to the third airtime value. As a result, the second airtime value must correspond to a noticeable improvement over the first airtime value in order for the media device 102 to change the preferred configuration when the device 110 is already connected to the media device 102.

Figure 6:
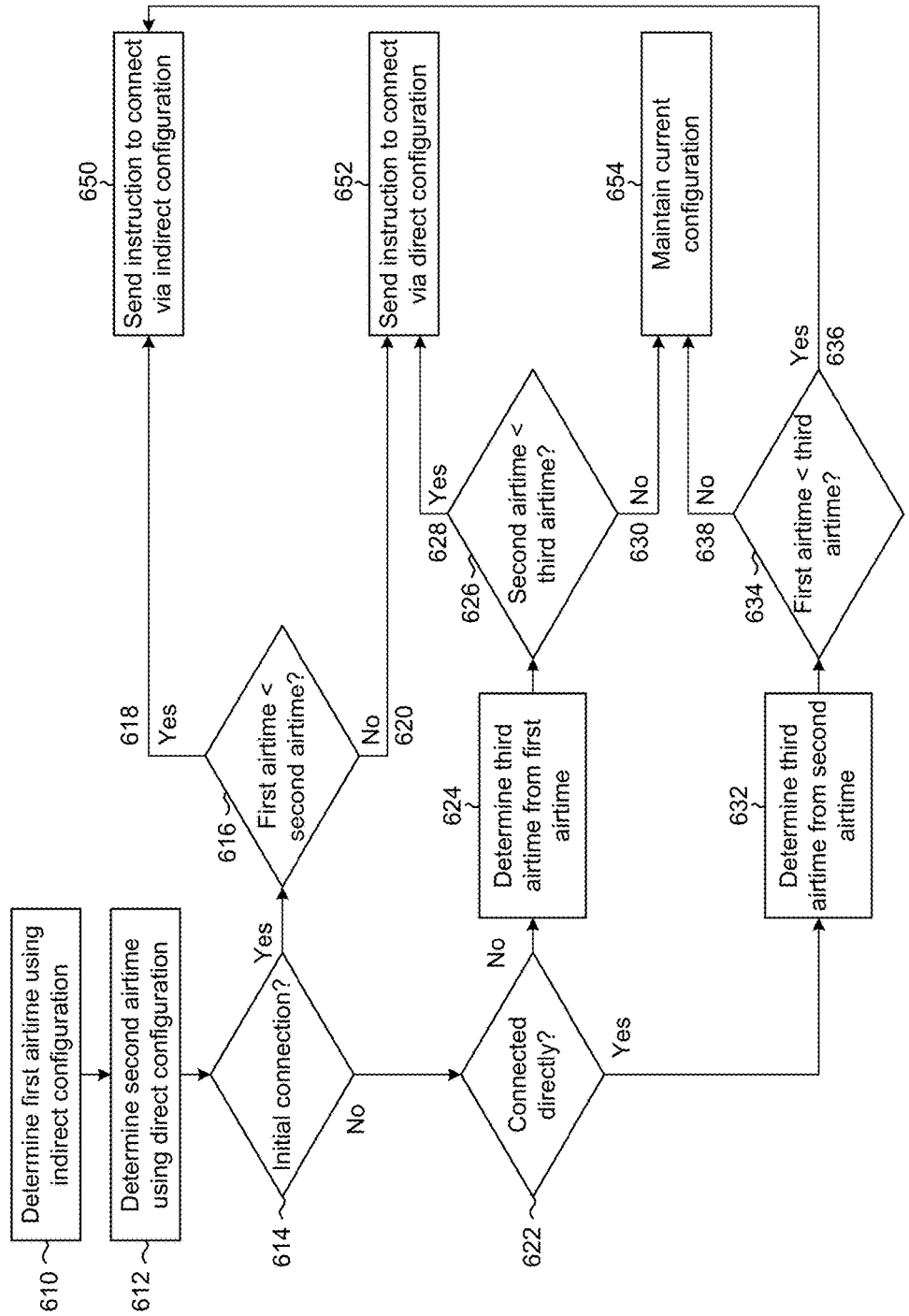
FIG. 6 is a flowchart conceptually illustrating an example method for selecting a preferred configuration according to embodiments of the present disclosure.

FIG. 6 is a flowchart conceptually illustrating an example method for selecting a preferred configuration according to embodiments of the present disclosure. As illustrated in FIG. 6, the media device 102 may determine (610) a first airtime value of the indirect configuration 210. For example, the media device 102 may sum a first reciprocal of the first available bandwidth and a second reciprocal of the second available bandwidth to determine the first airtime value, as shown in the following equation:

$$T_{air\_AP} = 1/TH_{cong1} + 1/TH_{cong2} \qquad [8]$$

where $T_{air\_AP}$ is the first airtime value corresponding to the AP 20, $TH_{cong1}$ is the first available bandwidth and $TH_{cong2}$ is the second available bandwidth.

The media device 102 may determine (612) a second airtime value of the direct configuration 220. For example, the media device 102 may sum a third reciprocal of the third available bandwidth to determine the second airtime value, as shown in the following equation:

$$T_{air\_M} = 1/TH_{cong3} \qquad [9]$$

where $T_{air\_M}$ is the second airtime value corresponding to the media device 102 and $TH_{cong3}$ is the third available bandwidth.

The media device 102 may determine (614) if the media device 102 is communicating with the device 110 in an initial connection (e.g., prior to determining a preferred configuration). If it is an initial connection, the media device 102 may determine (616) if the first airtime value is less than the second airtime value. If the first airtime value is lower, the media device 102 may loop (618) to step 650 and send (650) an instruction to the device 110 to connect to the media device 102 via the indirect configuration 210. If the first airtime value is not lower, the media device 102 may loop (620) to step 652 and send (652) an instruction to the device 110 to connect to the media device 102 via the direct configuration 220.

If the media device 102 determines in step 614 that it is not an initial connection, the media device 102 will incorporate a threshold value for hysteresis in order to prevent the media device 102 from switching between the direct configuration and the indirect configuration. As illustrated n FIG. 6, the media device 102 may determine (622) if the device 110 is connected directly to the media device 102. If the device 110 is not directly connected, the media device 102 may determine (624) a third airtime value by subtracting the threshold value from the first airtime value and determine (626) if the second airtime value is less than the third airtime value. If the second airtime value is less than the third airtime value, the media device 102 may loop (628) to step 652 and send (652) an instruction to the device 110 to connect to the media device 102 via the direct configuration 220. If the second airtime value is not less than the third airtime value, the media device 102 may loop (630) to step 654 and maintain (654) the current configuration.

If the device 110 is directly connected, the media device 102 may determine (632) a third airtime value by subtracting the threshold value from the second airtime value and determine (634) if the first airtime value is less than the third airtime value. If the first airtime value is less than the third airtime value, the media device 102 may loop (636) to step 650 and send (650) an instruction to the device 110 to connect to the media device 102 via the indirect configuration 210. If the first airtime value is not less than the third airtime value, the media device 102 may loop (638) to step 654 and maintain (654) the current configuration.

While not illustrated in FIG. 6, the example method illustrated in FIG. 6 may be performed repeatedly to continually determine whether to select the direct configuration or the indirect configuration. Thus, after the media device 102 determines to maintain the current configuration in step 654 and/or to change configurations in steps 650/652, the media device 102 may loop back and repeat step 610.

In some examples, a remote control may be configured to send commands to the device 110, enabling a user to control the device 110. In order to receive the commands, the device 110 may communicate with the remote control using wireless signals (e.g., WiFi). For example, the device 110 may communicate with the remote control using the same wireless channel (e.g., frequency channel) that the device 110 communicates with the AP 20 and/or the media device 102. Thus, if the device 110 is connected to the AP 20 using a first wireless channel (e.g., channel 6 of the 2.4 GHz frequency band), the device 110 may receive data from the remote control via the first wireless channel. Similarly, if the device 110 is connected to the media device 102 using a second wireless channel (e.g., channel 1 of the 2.4 GHz frequency band or channel 44 of the 5 GHz frequency band), the device 110 may receive data from the remote control via the second wireless channel.

If the device 110 changes a wireless channel (e.g., switches from channel 6 of the 2.4 GHz frequency band to channel 44 of the 5 GHz frequency band), the device 110 will be on a different channel than the remote control and will therefore not be able to communicate with the remote control. In order to maintain remote control functionality, the device 110 may determine when the device 110 transitions to a new wireless channel and may send an instruction to the remote control to connect using the new wireless channel.

Figure 7A:
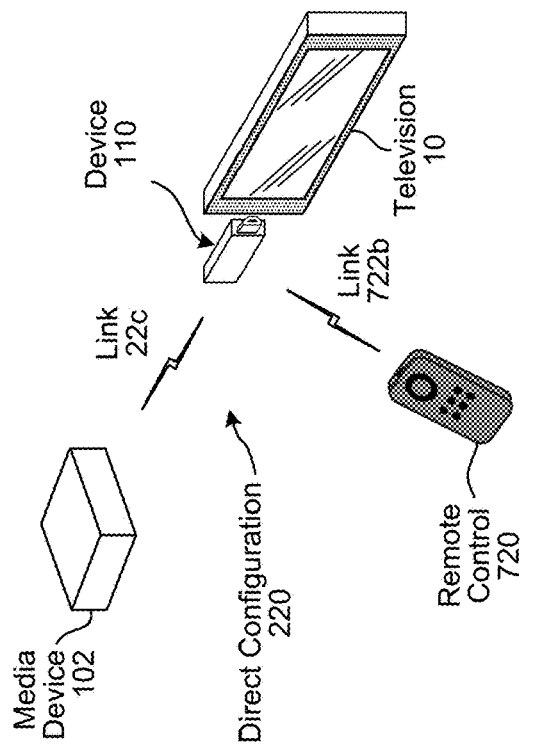
FIGS. 7A-7D illustrate examples of communication links with a remote control according to embodiments of the present disclosure.

FIGS. 7A-7D illustrate examples of communication links between a device and a remote control according to embodiments of the present disclosure. As illustrated in FIG. 7A, the device 110 may communicate with the media device 102 in the indirect configuration 210, such that the device 110 is connected to the AP 20 via the second communication link 22b and the AP 20 is connected to the media device 102 via the first communication link 22a. In the indirect configuration 210, the remote control 720 may be connected with the device 110 via a fourth communication link 722a using the same frequency channel as the second communication link 22b. For example, if the second communication link 22b corresponds to a first frequency channel (e.g., channel 6 of the 2.4 GHz frequency band), the fourth communication link 722a may correspond to the first frequency channel as well.

Similarly, the device 110 may communicate with the media device 102 in the direct configuration 220, such that the device 110 is connected to the media device 102 via the third communication link 22c. In the direct configuration 220, the remote control 720 may be connected with the device 110 via a fifth communication link 722b using the same frequency channel as the third communication link 22c. For example, if the third communication link corresponds to a second frequency channel (e.g., channel 1 of the 2.4 GHz frequency band or channel 44 of the 5 GHz frequency band), the fifth communication link 722b may correspond to the second frequency channel as well.

As discussed above, the device 110 may be connected to the AP 20 and/or the media device 102 via a wired connection (e.g., Ethernet or the like). For purposes of determining which connection with which to connect, the system 100 may treat the wired connection as having an ideal RSSI value (e.g., default maximum value for RSSI). When the device 110 is connected via the wired connection, the remote control 720 may communicate with the device 110 using a sixth communication link 722c. In some examples, the sixth communication link 722c may correspond to a third frequency channel (e.g., channel 11 of the 2.4 GHz frequency band), such that when the device 110 is connected via the wired connection the remote control 720 connects to the device 110 via the third frequency channel. However, the disclosure is not limited thereto and the sixth communication link 722c may correspond to either the first frequency channel or the second frequency channel without departing from the disclosure.

Figure 7B:
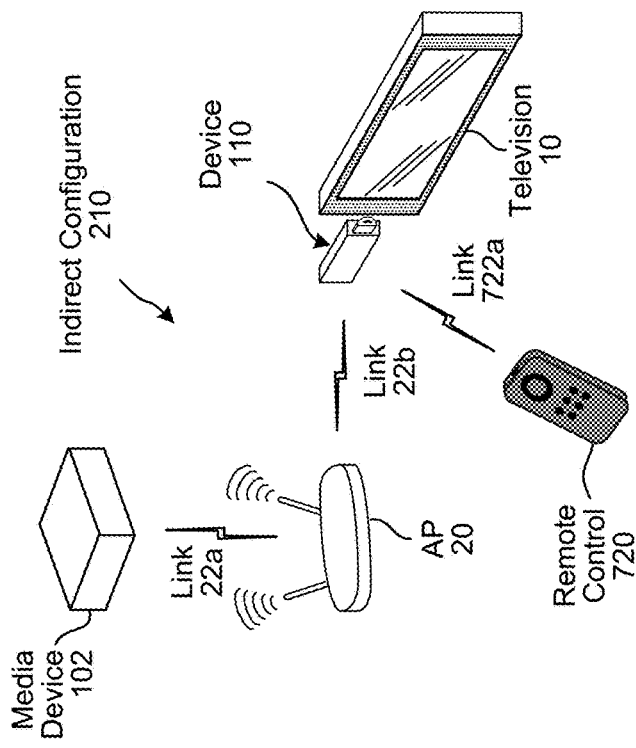
Figure 7C:
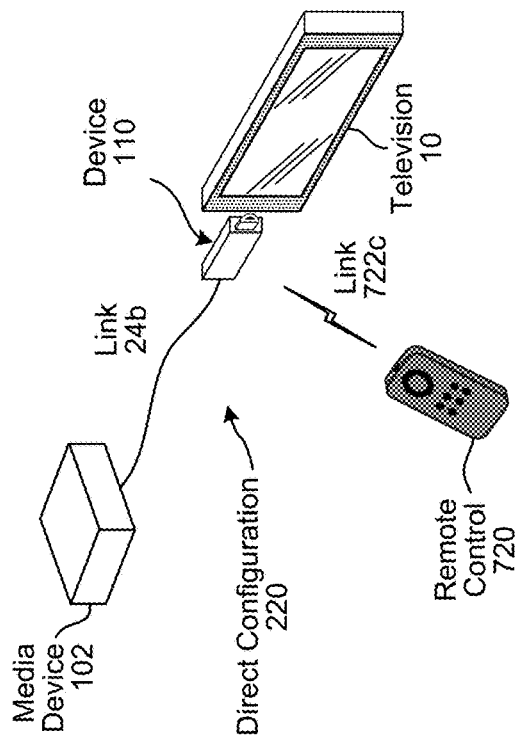
Figure 7D:
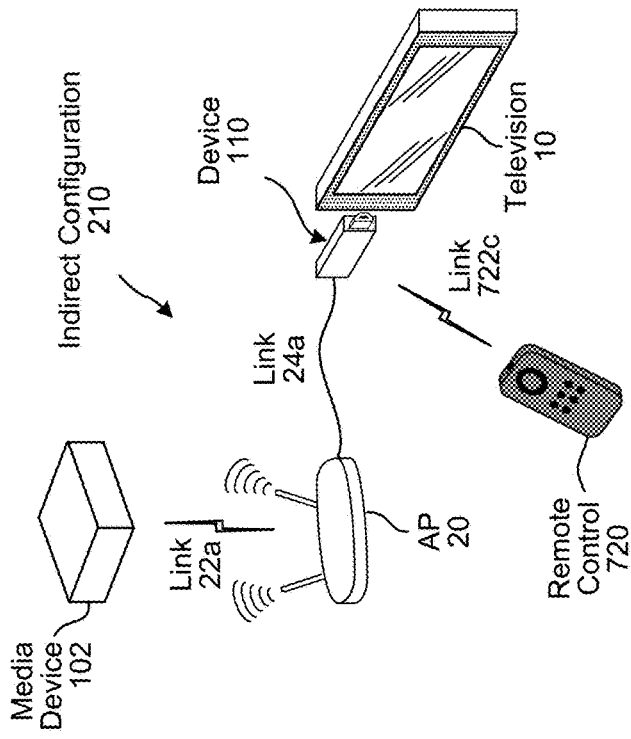

In some examples, the sixth communication link 722c may correspond to whichever frequency channel the device 110 was previously connected (e.g., frequency channel corresponding to the AP 20 or the media device 102 that is not associated with the wired communication link 24). For example, if the device 110 is connected to the AP 20 via a first wired communication link 24a, as illustrated in FIG. 7C, the sixth communication link 722c may correspond to the second frequency channel associated with the third communication link 22c. This may enable the device 110 to switch between the first wired communication link 24a in the indirect configuration 210 and the third communication link 22c in the direct configuration 220 without changing a frequency channel corresponding to the sixth communication link 722c. Additionally or alternatively, if the device 110 is connected to the media device 102 via a second wired communication link 24b, as illustrated in FIG. 7D, the sixth communication link 722c may correspond to the first frequency channel associated with the second communication link 22b. This may enable the device 110 to switch between the second communication link 22b in the indirect configuration 210 and the second wired communication link 24b in the direct configuration 220 without changing a frequency channel corresponding to the sixth communication link 722c.

Figure 8A:
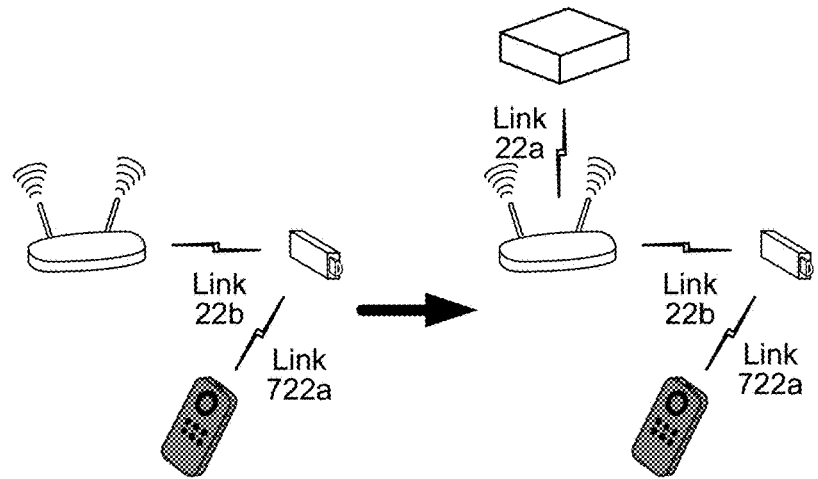

FIGS. 8A-8K illustrate examples of instructing the remote control to change communication links according to embodiments of the present disclosure. As illustrated in FIG. 8A, the device 110 may communicate with the AP 20 using the second communication link 22b and may start streaming video data from the media device 102 in the indirect configuration 210 (e.g., via the first communication link 22a and the second communication link 22b). As the device 110 continues to communicate with the AP 20 using the second communication link 22b, the remote control 720 may communicate with the device 110 via the fourth communication link 722a without changing a frequency channel.

Figure 8B:
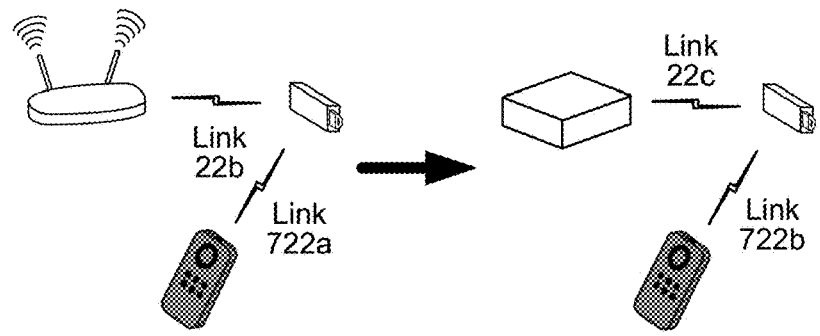

In contrast, FIG. 8B illustrates the device 110 may communicate with the AP 20 using the second communication link 22b and may start streaming video data from the media device 102 in the direct configuration 220 via the third communication link 22c. If the third communication link 22c corresponds to a different frequency channel than the second communication link 22b, the remote control will switch from the fourth communication link 722a (e.g., first frequency channel) to the fifth communication link 722b (e.g., second frequency channel). However, the disclosure is not limited thereto and in some examples the second communication link 22b and the third communication link 22c may correspond to the same frequency channel, such that the remote control 720 may continue to communicate with the device 110 without changing a frequency channel.

Figure 8C:
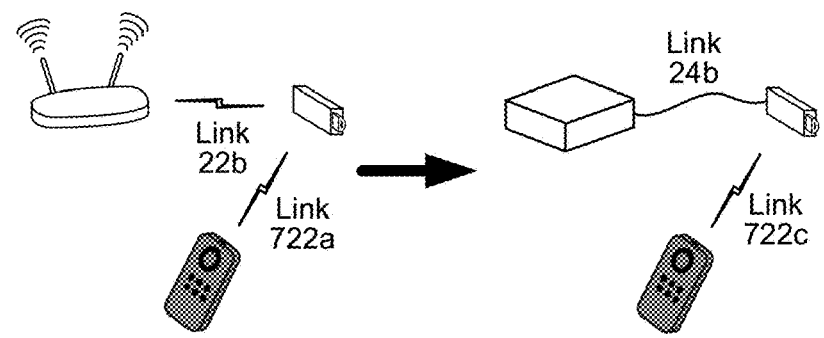

As illustrated in FIG. 8C, the device 110 may communicate with the AP 20 using the second communication link 22b and may start streaming video data from the media device 102 in the direct configuration 220 via the second wired communication link 24b. When the device 110 communicates with the AP 20 using the second communication link 22b, the remote control 720 may communicate with the device 110 using the fourth communication link 722a and when the device 110 communicates with the media device 102 using the second wired communication link 24b the remote control 720 may communicate with the device 110 using the sixth communication link 722c. As discussed above, the fourth communication link 722a and the sixth communication link 722c may correspond to the same frequency channel (e.g., first frequency channel), enabling the device 110 to switch between the second communication link 22b and the second wired communication link 24b without changing a frequency channel associated with the remote control 720. As the device 110 doesn't change a frequency channel to communicate with the media device 102, the remote control 720 may continue to communicate with the device 110 using the fourth communication link 722a without changing a frequency channel. Thus, the device 110 may only need to instruct the remote control 720 to change a frequency channel if the fourth communication link 722a corresponds to a different frequency channel than the sixth communication link 722c.

Figure 8D:
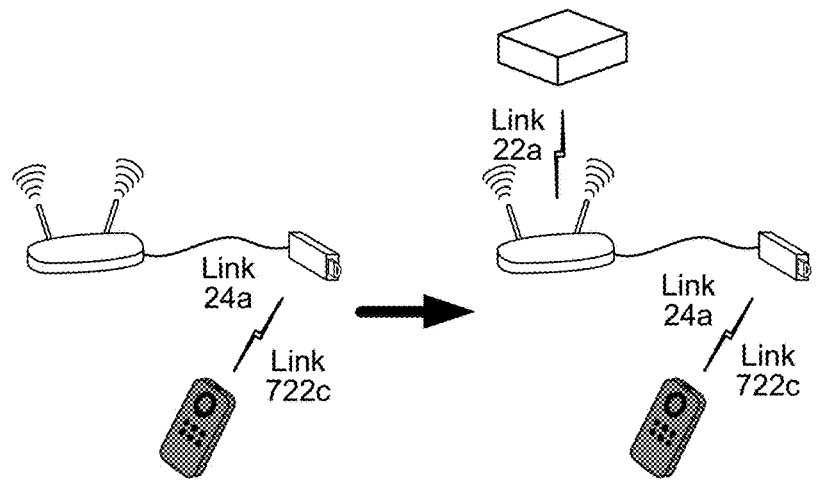

In some examples, the device 110 may communicate with the AP 20 using the first wired communication link 24a. As illustrated in FIG. 8D, the device 110 may communicate with the AP 20 using the first wired communication link 24a and may start streaming video data from the media device 102 in the indirect configuration 210 (e.g., via the first communication link 22a and the first wired communication link 24a). As the device 110 continues to communicate with the AP 20 using the first wired communication link 24a, the remote control 720 may continue to communicate with the device 110 using the sixth communication link 722c without changing a frequency channel. As discussed above, the sixth communication link 722c may correspond to a third frequency channel (e.g., frequency channel unique to the remote control 720) to avoid interference, such that when the device 110 communicates via a wired connection link 24 the device 110 communicates with the remote control 720 using the third frequency channel. However, the disclosure is not limited thereto and the sixth communication link 722c may correspond to the second frequency channel (e.g., frequency channel corresponding to the third communication link 22c), enabling the device 110 to switch between the first wired communication link 24a and the third communication link 22c without changing a frequency channel associated with the remote control 720.

Figure 8E:
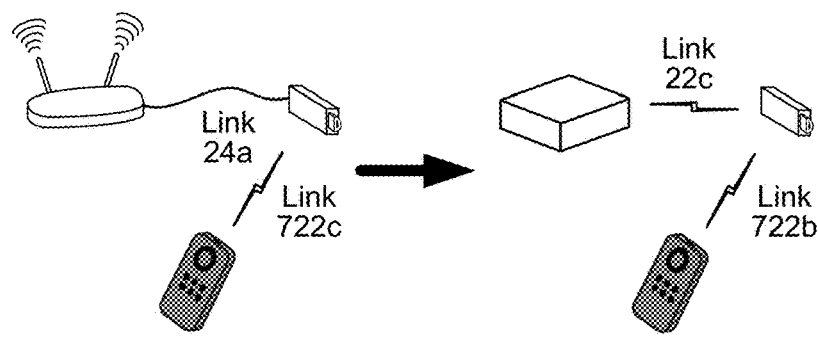

As illustrated in FIG. 8E, the device 110 may communicate with the AP 20 using the first wired communication link 24a and may start streaming video data from the media device 102 in the direct configuration 220 via the third communication link 22c. When the device 110 communicates with the AP 20 using the first wired communication link 24a, the remote control 720 may communicate with the device 110 using the sixth communication link 722c and when the device 110 communicates with the media device 102 using the third communication link 22c the remote control 720 may communicate with the device 110 using the fifth communication link 722b. As discussed above, the fifth communication link 722b and the sixth communication link 722c may correspond to the same frequency channel (e.g., second frequency channel), enabling the device 110 to switch between the first wired communication link 24a and the third communication link 22c without changing a frequency channel associated with the remote control 720. Thus, the device 110 only instructs the remote control 720 to change a frequency channel if the fifth communication link 722b corresponds to a different frequency channel than the sixth communication link 722c.

Figure 8F:
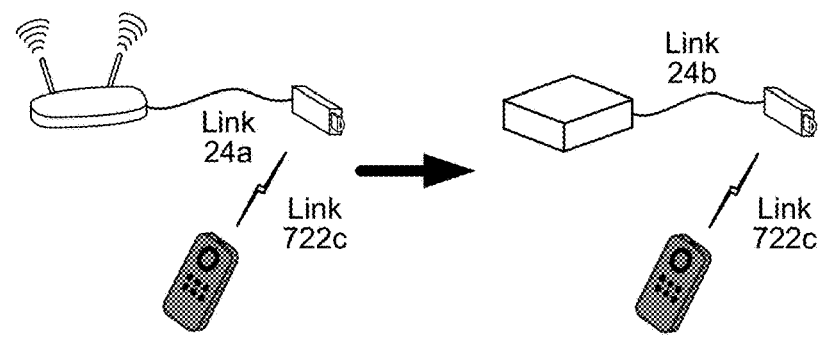

As illustrated in FIG. 8F, the device 110 may communicate with the AP 20 using the first wired communication link 24a and may start streaming video data from the media device 102 in the direct configuration 220 via the second wired communication link 24b. As the device 110 does not communicate with the AP 20 or the media device 102 using a wireless communication link 22, the remote control 720 may communicate with the device 110 using the sixth communication link 722c, enabling the device 110 to switch between the first wired communication link 24a and the second wired communication link 24b without changing a frequency channel associated with the remote control 720.

While FIGS. 8A-8F illustrate examples of connecting to the media device 102 (e.g., beginning to stream video data from the media device 102), FIGS. 8G-8K illustrate examples of disconnecting from the media device 102 (e.g., no longer streaming video data from the media device 102).

As illustrated in FIG. 8G, the device 110 may switch from communicating with the media device 102 using the indirect configuration 210 (e.g., first communication link 22a and second communication link 22b) to communicating with the AP 20 using the second communication link 22b. As the device 110 continues to communicate with the AP 20 using the second communication link 22b, the remote control 720 may continue to communicate with the device 110 using the fourth communication link 722a without changing a frequency channel.

FIGS. 8H and 8I illustrate examples of the device 110 switching from communicating with the media device 102 using the third communication link 22c to communicating with the AP 20. While the device 110 communicates with the media device 102 using the third communication link 22c, the device 110 may communicate with the remote control 720 using the fifth communication link 722b. As illustrated in FIG. 8H, when the device 110 communicates with the AP 20 using the second communication link 22b, the device 110 may communicate with the remote control 720 using the fourth communication link 722a. Therefore, the device 110 may instruct the remote control 720 to change the frequency channel prior to the device 110 connecting to the AP 20 using the second communication link 22b.

As illustrated in FIG. 8I, when the device 110 communicates with the AP 20 using the first wired communication link 24a, the device 110 may communicate with the remote control 720 using the sixth communication link 722c. In some examples, the fifth communication link 722b and the sixth communication link 722c may correspond to the same frequency channel (e.g., second frequency channel), such that the remote control 720 does not need to change frequency channels to continue to communicate with the device 110.

FIGS. 8J and 8K illustrate examples of the device 110 switching from communicating with the media device 102 using the second wired communication link 24b to communicating with the AP 20. While the device 110 communicates with the media device 102 using the second wired communication link 24b, the device 110 may communicate with the remote control 720 using the sixth communication link 722c. As illustrated in FIG. 8J, when the device 110 communicates with the AP 20 using the second communication link 22b, the device 110 may communicate with the remote control 720 using the fourth communication link 722a. In some examples, the fourth communication link 722a and the sixth communication link 722c may correspond to the same frequency channel (e.g., first frequency channel), such that the remote control 720 does not need to change frequency channels to continue to communicate with the device 110.

As illustrated in FIG. 8K, when the device 110 communicates with the AP 20 using the first wired communication link 24a, the device 110 may communicate with the remote control 720 using the sixth communication link 722c. Therefore, the remote control 720 does not need to change frequency channels to continue to communicate with the device 110.

Figure 9A:
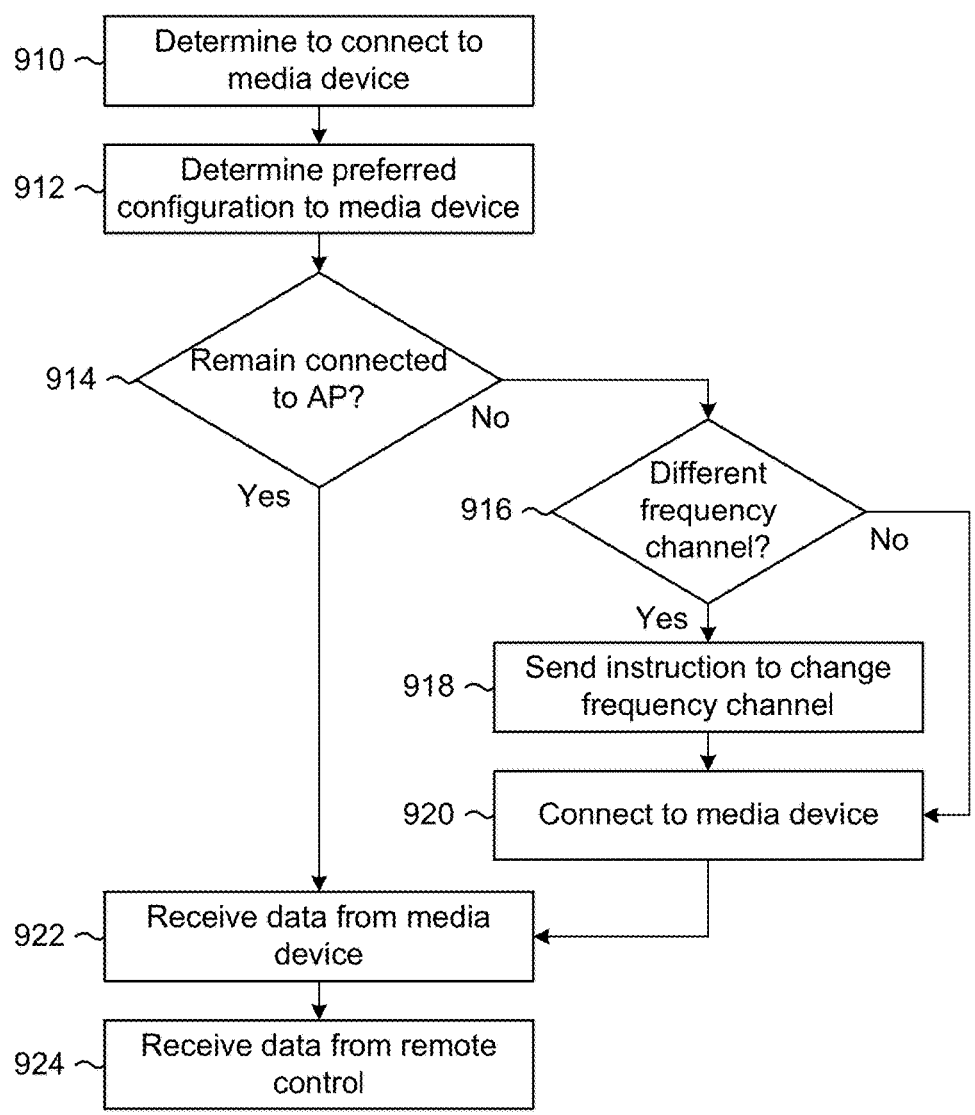
FIGS. 9A-9B are flowcharts conceptually illustrating example methods for instructing the remote control according to embodiments of the present disclosure.
Figure 9B:
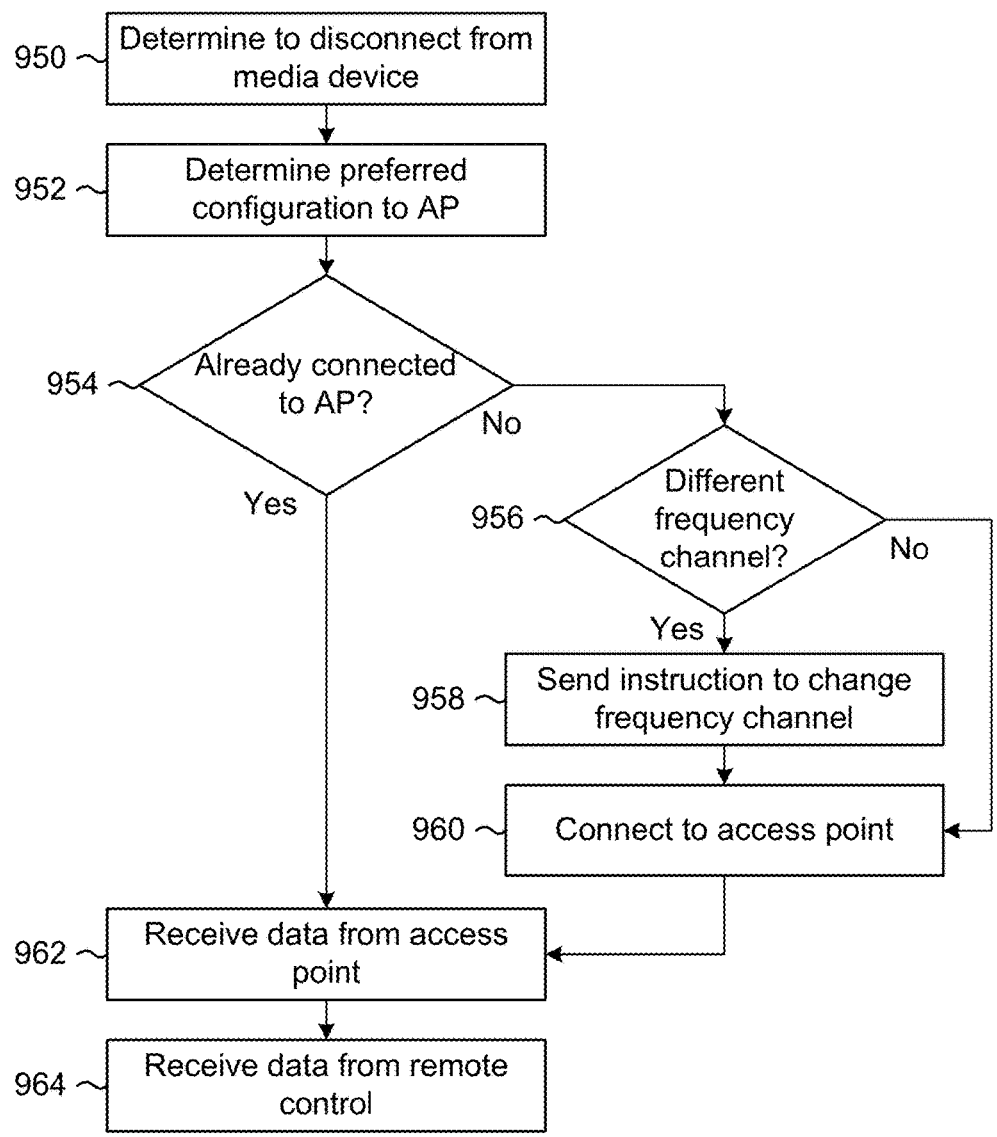

FIGS. 9A-9B are flowcharts conceptually illustrating example methods for instructing the remote control according to embodiments of the present disclosure. FIG. 9A is a flowchart illustrating an example method for connecting to the media device 102 (e.g., beginning to stream video data from the media device 102), whereas FIG. 9B is a flowchart illustrating an example method for disconnecting from the media device 102 (e.g., no longer streaming video data from the media device 102 and connecting to the AP 20 instead).

As illustrated in FIG. 9A, the device 110 may determine (910) to connect to the media device 102 and may determine (912) a preferred configuration with which to connect to the media device 102. For example, the device 110 may receive a command from the remote control 720 instructing the device 110 to connect to the media device 102, although the disclosure is not limited thereto and the device 110 may receive a command from the media device 102 or nay other device without departing from the disclosure. In some examples, the media device 102 may determine the preferred configuration. For example, the media device 102 may select the preferred configuration based on data rates and/or airtime values and may instruct the device 110 to connect to the media device 102 using the preferred configuration. However, the disclosure is not limited thereto and the device 110 may determine the preferred configuration without departing from the disclosure.

Based on the preferred configuration, the device 110 may determine (914) if the device 110 will remain connected to the AP 20. If the device 110 will remain connected to the AP 20 (e.g., connecting to the media device 102 via the indirect configuration 210), the remote control 720 may continue to communicate with the device 110 without changing a frequency channel. If the device 110 will not remain connected to the AP 20 (e.g., connecting to the media device 102 via the direct configuration 220), the device 110 may determine (916) if the preferred configuration is associated with a different frequency channel. For example, if the device 110 switches from the second communication link 22b to the third communication link 22c and the third communication link 22c corresponds to a different frequency channel (e.g., different channel in the 2.4 GHz frequency band, different channel in the 5 GHz frequency band instead of 2.4 GHz frequency band, etc.) than the second communication link 22b, then connecting to the media device 102 may correspond to a different frequency channel (e.g., second frequency channel), as illustrated in FIG. 8B. However, if the device 110 connects to the AP 20 and/or the media device 102 via a wired connection 24, then connecting to the media device 102 does not correspond to a different frequency channel, as illustrated in FIGS. 8C, 8E and 8F.

If the device 110 determines that the preferred configuration is associated with a different frequency channel, the device 110 may send (918) an instruction to the remote control 720 to change frequency channels. For example, the device 110 may indicate the new frequency channel and the remote control 720 may communicate with the device 110 using the new frequency channel. After sending the instruction to the remote control in step 918, or if the device 110 determines that the preferred configuration is not associated with a different frequency channel in step 916, the device 110 may connect (920) to the media device using the preferred configuration. For example, the device 110 may connect to the media device 102 using the third communication link 22c and/or the second wired communication link 24b, as illustrated in FIGS. 7B and 7D.

After connected to the media device 102 in step 920, or if the device 110 determines that the device 110 will remain connected to the AP 20 in step 914, the device 110 may receive (922) data from the media device 102 and may receive (924) data from the remote control 720. For example, the device 110 may receive video data from the media device 102 using the indirect configuration 210 and/or the direct configuration 220 and may receive data from the remote control using a frequency channel corresponding to the preferred configuration. The device 110 may continue to stream video data from the media device 102 and receive commands from the remote control 720 until the device 110 receives an instruction to stop streaming the video data. While FIG. 9A illustrates step 924 as a discrete step occurring after steps 910-922, the disclosure is not limited thereto. Instead, the device 110 may receive data from the remote control 720 at any time. For example, the device 110 may receive data from the remote control 720 prior to, during and/or after performing steps 910-922 without departing from the disclosure.

As illustrated in FIG. 9B, the device 110 may determine (950) to disconnect from the media device 102, may determine (952) a preferred configuration to the AP 20 and may determine (954) whether the device 110 is already connected to the AP 20. For example, the device 110 may receive an instruction from the media device 102 instructing the device 110 to connect to the AP 20 directly (e.g., disconnect from the media device 102 via the direct configuration 220 and connect to the AP 20 via the indirect configuration 210). However, the disclosure is not limited thereto and in some examples, the device 110 may receive an instruction from the media device 102 to remain connected to the media device 102. For example, the media device 102 may determine that the optimum configuration is for the media device 102 to operate as a range extender between the device 110 and the AP 20, sending data from the device 110 to the AP 20 and/or from the AP 20 to the device 110. To illustrate an example, the media device 102 may be positioned closer to the AP 20 than the device 110, may have a stronger antenna, and/or may have more broadcasting power than the device 110. Thus, a first throughput from the device 110 to the AP 20 via the media device 102 may be higher than a second throughput directly from the device 110 to the AP 20.

If the device 110 is already connected to the AP 20 (e.g., connected to the media device 102 via the indirect configuration 210), the remote control 720 may continue to communicate with the device 110 without changing a frequency channel. If the device 110 is not already connected to the AP 20 (e.g., connected to the media device 102 via the direct configuration 220), the device 110 may determine (956) if the connection to the AP 20 is associated with a different frequency channel. For example, if the device 110 switches from the third communication link 22c to the second communication link 22b and the second communication link 22b corresponds to a different frequency channel (e.g., different channel in the 2.4 GHz frequency band, different channel in the 5 GHz frequency band instead of 2.4 GHz frequency band, etc.) than the third communication link 22c, then connecting to the AP 20 may correspond to a different frequency channel (e.g., first frequency channel), as illustrated in FIG. 8H. However, if the device 110 connects to the AP 20 and/or the media device 102 via a wired connection 24, then connecting to the AP 20 may not correspond to a different frequency channel, as illustrated in FIGS. 8I, 8J and 8K.

If the device 110 determines that the connection to the AP 20 is associated with a different frequency channel, the device 110 may send (958) an instruction to the remote control 720 to change frequency channels. For example, the device 110 may indicate the new frequency channel and the remote control 720 may communicate with the device 110 using the new frequency channel. After sending the instruction to the remote control in step 958, or if the device 110 determines that the connection to the AP 20 is not associated with a different frequency channel in step 956, the device 110 may connect (960) to the AP 20. For example, the device 110 may connect to the AP 20 using the second communication link 22b and/or the first wired communication link 24a, as illustrated in FIGS. 7A and 7C.

After connected to the AP 20 in step 960, or if the device 110 determines that the device 110 is already connected to the AP 20 in step 954, the device 110 may receive (962) data from the AP 20 and may receive (964) data from the remote control 720. For example, the device 110 may receive data from the AP 20 using the second communication link 22b and/or the first wired communication link 24a and may receive data from the remote control using a frequency channel corresponding to the communication link. For example, the frequency channel may correspond to the first frequency channel associated with the AP 20 and/or the third frequency channel unique to the remote control 720, although the disclosure is not limited thereto. While FIG. 9B illustrates step 964 as a discrete step occurring after steps 950-962, the disclosure is not limited thereto. Instead, the device 110 may receive data from the remote control 720 at any time. For example, the device 110 may receive data from the remote control 720 prior to, during and/or after performing steps 950-962 without departing from the disclosure.

In some examples, the device 110 may send an instruction to the remote control 720 to change frequency channels, as discussed above with regard to steps 918 and 958. For example, the device 110 may send an explicit instruction to the remote control 720 to change frequency channels to the new frequency channel indicated by the instruction (e.g., simple command). However, the disclosure is not limited thereto and in some examples, the device 110 may send a notification to the remote control 720 indicating that the device 110 will be switching to the new frequency channel. Thus, the remote control 720 may determine whether to switch to the new frequency channel or remain on the current frequency channel. For example, the remote control 720 may determine to switch to the new frequency channel (e.g., continue communicating with the device 110) or may determine to stay on the current frequency channel and stop communicating with the device 110 (e.g., if the remote control 720 is communicating with other devices on the current frequency channel).

Thus, while FIGS. 7A-9B illustrate the remote control 720 as a remote control configured to send commands to the device 110, the disclosure is not limited thereto. Instead, the remote control 720 may be any remote device configured to send data to and/or receive data from the device 110 using a wireless communication link. For example, the remote control 720 may include a remote storage (e.g., media storage devices, hard disk drives, etc. to stream video data to the device 110), a smart phone configured to remotely control the device 110, a second device 110b configured to mirror video data (e.g., the first device 110a sends video data to the second device 110b, such that both the first device 110a and the second device 110b are configured to cause the video data to be displayed on separate displays), or the like, Additionally or alternatively, the device 110 may use similar steps as described above with regard to the remote control 720 to communicate with remote devices without departing from the disclosure. Thus, as a parent device (e.g., device 110) changes frequency channels, the parent device may send instructions and/or notifications to multiple children devices (e.g., remote control 720, remote device, etc.) such that the one or more children devices may change frequency channels to follow the parent device.

Figure 10:
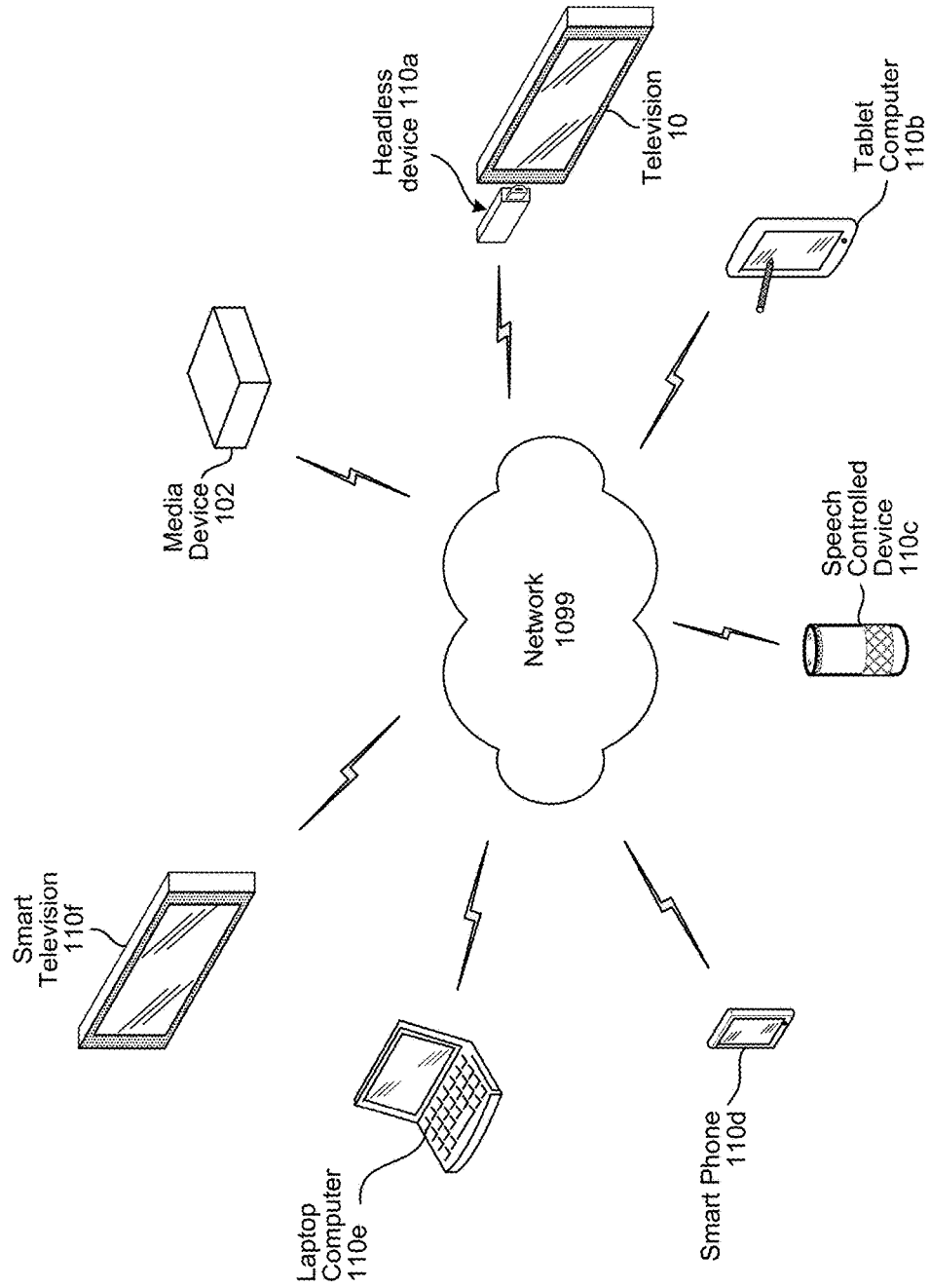
FIG. 10 illustrates an example of a computer network for use with the system.

As illustrated in FIG. 10 devices 102/110 may contain components of the system 100 and the devices 102/110 may be connected over a network 1099. The network 1099 may be a local or private network originating from the media device 102 and/or an access point (not shown). Devices may be connected to the network 1099 through either wired or wireless connections. For example, a headless device 110a, a tablet computer 110b, a speech controlled device 110c, a smart phone 110d, a laptop computer 110e and/or a smart television 110f may be connected to the network 1099 through a wireless connection.

Figure 11:
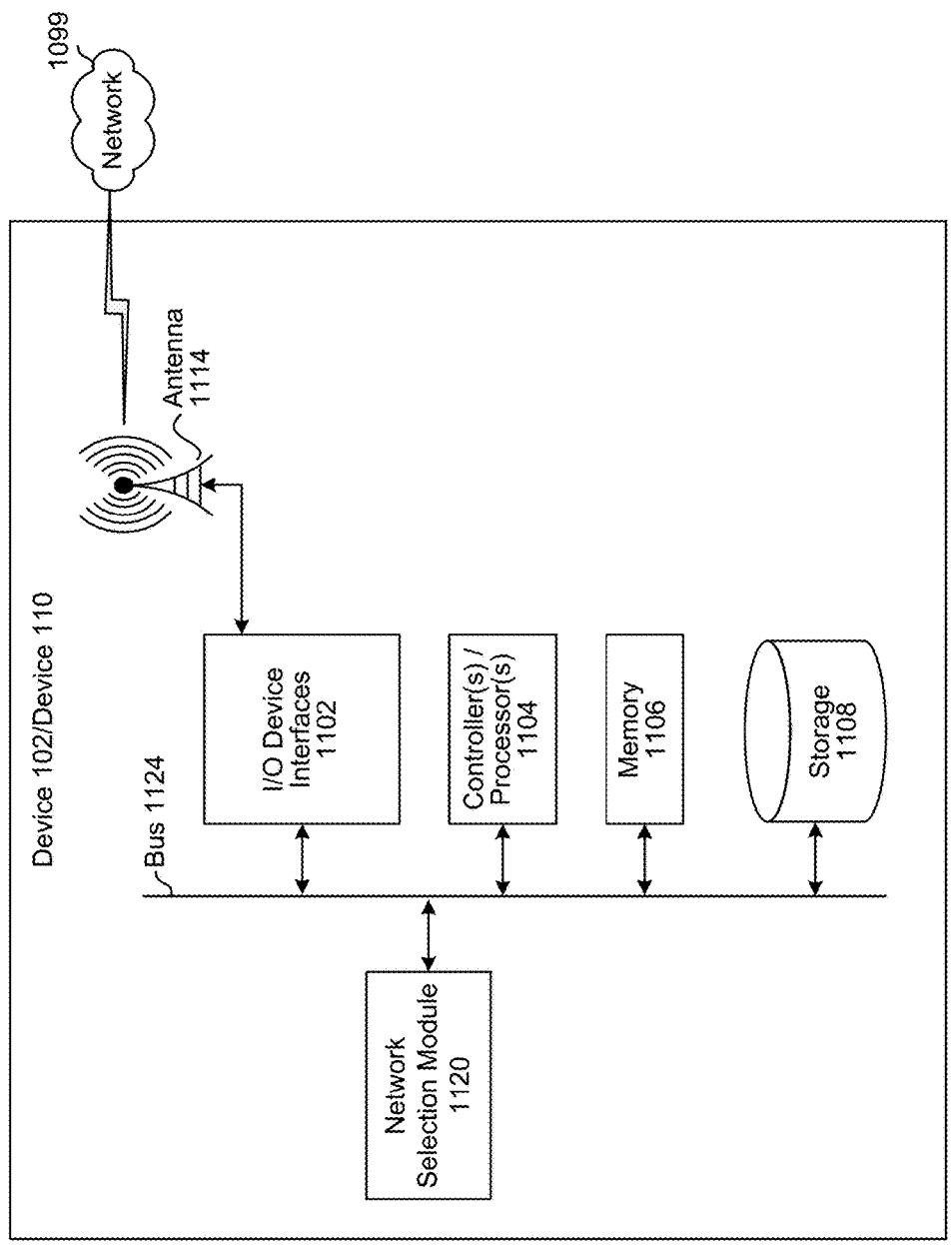
FIG. 11 is a block diagram conceptually illustrating example components of a device according to embodiments of the present disclosure.

FIG. 11 illustrates a block diagram conceptually illustrating example components of a device 102/110 according to the present embodiments. In operation, the device 102/110 may include computer-readable and computer-executable instructions that reside in storage 1108 on the device 102/110. The device 102/110 may be an electronic device capable of connecting to a wireless network. Examples of electronic devices may include computers (e.g., a desktop, a laptop, a server or the like), portable devices (e.g., a camera, smart phone, tablet or the like), media devices (e.g., televisions, headless devices, video game consoles or the like) or the like. The device 102/110 may also be a component of any of the abovementioned devices or systems.

As illustrated in FIG. 11, the device 102/110 may include an address/data bus 1124 for conveying data among components of the device 102/110. Each component within the device 102/110 may also be directly connected to other components in addition to (or instead of) being connected to other components across the bus 1124.

The device 102/110 may include one or more controllers/processors 1104 comprising one-or-more central processing units (CPUs) for processing data and computer-readable instructions and a memory 1106 for storing data and instructions. The memory 1106 may include volatile random access memory (RAM), non-volatile read only memory (ROM), non-volatile magnetoresistive (MRAM) and/or other types of memory. The device 102/110 may also include a data storage component 1108 for storing data and processor-executable instructions. The data storage component 1108 may include one or more non-volatile storage types such as magnetic storage, optical storage, solid-state storage, etc. The device 102/110 may also be connected to a removable or external non-volatile memory and/or storage (such as a removable memory card, memory key drive, networked storage, etc.) through the input/output device interfaces 1102.

The device 102/110 includes input/output device interfaces 1102. The input/output device interfaces 1102 may be configured to operate with a network 1099 (e.g., via antenna 1114), for example a wireless local area network (WLAN) (such as WiFi), Bluetooth, zigbee and/or wireless networks, such as a Long Term Evolution (LTE) network, WiMAX network, 3G network, etc. The network 1099 may include a local or private network or may include a wide network such as the internet. Devices may be connected to the network 1099 through a wireless connection.

The input/output device interfaces 1102 may also include an interface for an external peripheral device connection such as universal serial bus (USB), FireWire, Thunderbolt, Ethernet port or other connection protocol that may connect to networks 1099.

The device 102/110 further includes a network selection module 1120, which may comprise processor-executable instructions stored in storage 1108 to be executed by controller(s)/processor(s) 1104 (e.g., software, firmware), hardware, or some combination thereof. For example, components of the network selection module 1120 may be part of a software application running in the foreground and/or background on the device 102/110. The network selection module 1120 may control the device 102/110 as discussed above, for example with regard to FIGS. 1, 3, 4A-4B, 5, 6 and/or 9A-9B. Some or all of the controllers/modules of the network selection module 1120 may be executable instructions that may be embedded in hardware or firmware in addition to, or instead of, software. In one embodiment, the device 102/110 may operate using an Android operating system (such as Android 4.3 Jelly Bean, Android 4.4 KitKat or the like), an Amazon operating system (such as FireOS or the like), or any other suitable operating system.

Executable computer instructions for operating the device 102/110 and its various components may be executed by the controller(s)/processor(s) 1104, using the memory 1106 as temporary "working" storage at runtime. The executable instructions may be stored in a non-transitory manner in non-volatile memory 1106, storage 1108, or an external device. Alternatively, some or all of the executable instructions may be embedded in hardware or firmware in addition to or instead of software.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, speech processing systems, distributed computing environments, etc. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    receiving, by a streaming media device using a first frequency channel, first video data from a wireless access point device via a first wireless communication link;
    receiving, by the streaming media device using the first frequency channel, a first instruction originating from a media transmitting device and instructing the streaming media device to connect to the media transmitting device via a second wireless communication link using a second frequency channel;
    determining, by the streaming media device, that the second frequency channel is different than the first frequency channel;
    sending, in response to determining that the second frequency channel is different than the first frequency channel, by the streaming media device using the first frequency channel, a second instruction to a remote device via a third wireless communication link, the second instruction instructing the remote device to connect to the streaming media device via the third wireless communication link using the second frequency channel;
    receiving, by the streaming media device using the second frequency channel, second video data from the media transmitting device via the second wireless communication link; and
    receiving, by the streaming media device using the second frequency channel, data from the remote device via the third wireless communication link.

2. The computer-implemented method of claim 1, further comprising:
- receiving, by the streaming media device using the second frequency channel, a third instruction from the media transmitting device via the second wireless communication link, the third instruction instructing the streaming media device to connect to the wireless access point device via the first wireless communication link using the first frequency channel;
- determining, by the streaming media device, that the first frequency channel is different than the second frequency channel;
- sending, by the streaming media device using the second frequency channel, a fourth instruction to the remote device via the third wireless communication link, the fourth instruction instructing the remote device to connect to the streaming media device via the third wireless communication link using the first frequency channel;
- receiving, by the streaming media device using the first frequency channel, third video data from the wireless access point device via the first wireless communication link; and
- receiving, by the streaming media device using the first frequency channel, second data from the remote device via the third wireless communication link.

3. The computer-implemented method of claim 1, further comprising:
- receiving, by the streaming media device using the second frequency channel, a third instruction from the media transmitting device via the second wireless communication link, the third instruction instructing the streaming media device to connect to the wireless access point device via a wired communication link;
- receiving, by the streaming media device, third video data from the wireless access point device via the wired communication link; and
- receiving, by the streaming media device using the second frequency channel, second data from the remote device via the third wireless communication link.

4. The computer-implemented method of claim 1, further comprising:
- receiving, by the streaming media device using the second frequency channel, a third instruction from the media transmitting device via the second wireless communication link, the third instruction instructing the streaming media device to connect to the wireless access point device via the first wireless communication link using the second frequency channel;
- receiving, by the streaming media device using the second frequency channel, third video data from the wireless access point device via the first wireless communication link; and
- receiving, by the streaming media device using the second frequency channel, second data from the remote device via the third wireless communication link.

5. The computer-implemented method of claim 1, further comprising, prior to receiving the first instruction:
- receiving, by the streaming media device, a request for a signal strength value corresponding to the first wireless communication link, the request originating from the media transmitting device;
- determining, by the streaming media device, the signal strength value; and
- sending, by the streaming media device, the signal strength value to the media transmitting device.

6. The computer-implemented method of claim 1, further comprising:
- receiving, by the streaming media device using the first frequency channel, the first video data from the wireless access point device via the first wireless communication link, the first video data originating from the media transmitting device;
- determining, by the streaming media device, at least one of a resolution of the first video data is below a first threshold or a throughput associated with the first wireless communication link is below a second threshold;
- sending, by the streaming media device using the first frequency channel, an indication to the media transmitting device via the wireless access point device, the indication indicating that at least one of the resolution of the first video data is below the first threshold or the throughput is below the second threshold; and
- receiving, by the streaming media device using the first frequency channel, the first instruction from the wireless access point via the first wireless communication link.

7. The computer-implemented method of claim 1, further comprising, after receiving the first video data:
- receiving, by the streaming media device using the first frequency channel, a third instruction from the wireless access point device via the first wireless communication link, the third instruction originating from the media transmitting device and instructing the streaming media device to connect to the media transmitting device via the second wireless communication link using the first frequency channel;
- receiving, by the streaming media device using the first frequency channel, third video data from the media transmitting device via the second wireless communication link;
- determining, by the streaming media device, at least one of a resolution of the third video data is below a first threshold or a throughput associated with the second wireless communication link is below a second threshold;
- sending, by the streaming media device using the first frequency channel, an indication to the media transmitting device via the second wireless communication link indicating that at least one of the resolution of the first video data is below the first threshold or the throughput is below the second threshold; and
- receiving, by the streaming media device using the first frequency channel, the first instruction from the media transmitting device via the second wireless communication link.

8. The computer-implemented method of claim 1, further comprising:
- determining, by the streaming media device, at least one of a resolution of the second video data is below a first threshold or a throughput associated with the second wireless communication link is below a second threshold;
- sending, by the streaming media device using the second frequency channel, an indication to the media transmitting device via the second wireless communication link indicating that at least one of the resolution of the first video data is below the first threshold or the throughput is below the second threshold;
- receiving, by the streaming media device using the second frequency channel, a third instruction from the media transmitting device via the second wireless communication link, the third instruction instructing the streaming media device to connect to the media transmitting device via the second wireless communication link using a third frequency channel;

determining that the third frequency channel is different than the second frequency channel;

sending, by the streaming media device using the second frequency channel, a fourth instruction to the remote device via the third wireless communication link, the fourth instruction instructing the remote device to connect to the streaming media device via the third wireless communication link using the third frequency channel;

receiving, by the streaming media device using the third frequency channel, third video data from the media transmitting device via the second wireless communication link; and receiving, by the streaming media device using the third frequency channel, second data from the remote device via the third wireless communication link.

9. The computer-implemented method of claim 1, further comprising:

determining, by the streaming media device based on the data received from the remote device, to end a streaming session associated with the second video data, the second video data originating from the media transmitting device;

sending, by the streaming media device using the second frequency channel, a third instruction to the media transmitting device via the second wireless communication link, the third instruction instructing the media transmitting device to end the streaming session;

receiving, by the streaming media device using the second frequency channel, a fourth instruction from the media transmitting device via the second wireless communication link, the fourth instruction instructing the streaming media device to remain connected to the media transmitting device;

receiving, by the streaming media device using the second frequency channel, third video data from the media transmitting device via the second wireless communication link, the third video data originating from the wireless access point device; and receiving, by the streaming media device using the second frequency channel, second data from the remote device via the third wireless communication link.

10. A computer-implemented method comprising:

receiving, by a streaming media device, using a first frequency channel, first video data from a media transmitting device via a first wireless communication link;

receiving, by the streaming media device using the first frequency channel, a first instruction from the media transmitting device via the first wireless communication link, the first instruction instructing the streaming media device to connect to a wireless access point device via a second wireless communication link using a second frequency channel;

determining, by the streaming media device, that the second frequency channel is different than the first frequency channel;

sending, in response to determining that the second frequency channel is different than the first frequency channel, by the streaming media device using the first frequency channel, a second instruction to a remote device via a third wireless communication link, the second instruction instructing the remote device to connect to the streaming media device via the third wireless communication link using the second frequency channel;

receiving, by the streaming media device using the second frequency channel, second video data from the wireless access point via the second wireless communication link; and receiving, by the streaming media device using the second frequency channel, data from the remote control device via the third wireless communication link.

11. The computer-implemented method of claim 10, further comprising:

receiving, by the streaming media device using the second frequency channel, a third instruction from the wireless access point device via the second wireless communication link, the third instruction originating from the media transmitting device and instructing the streaming media device to connect to the media transmitting device via the first wireless communication link using the first frequency channel;

determining, by the streaming media device, that the first frequency channel is different than the second frequency channel;

sending, by the streaming media device using the second frequency channel, a fourth instruction to the remote device via the third wireless communication link, the fourth instruction instructing the remote device to connect to the streaming media device via the third wireless communication link using the first frequency channel;

receiving, by the streaming media device using the first frequency channel, third video data from the media transmitting device via the first wireless communication link; and receiving, by the streaming media device using the first frequency channel, second data from the remote device via the third wireless communication link.

12. The computer-implemented method of claim 11, further comprising:

determining, by the streaming media device based on the second data received from the remote device, to end a streaming session associated with the third video data, the third video data originating from the media transmitting device;

sending, by the streaming media device using the first frequency channel, a fifth instruction to the media transmitting device via the first wireless communication link, the fifth instruction instructing the media transmitting device to end the streaming session;

receiving, by the streaming media device using the first frequency channel, a sixth instruction from the media transmitting device via the first wireless communication link, the sixth instruction instructing the streaming media device to remain connected to the media transmitting device;

receiving, by the streaming media device using the first frequency channel, fourth video data from the media transmitting device via the first wireless communication link, the fourth video data originating from the wireless access point device; and receiving, by the streaming media device using the first frequency channel, third data from the remote device via the third wireless communication link.

13. The computer-implemented method of claim 10, further comprising:

receiving, by the streaming media device using the second frequency channel, a third instruction from the wireless access point device via the second wireless communication link, the third instruction originating from the media transmitting device and instructing the streaming media device to connect to the media transmitting device via the first wireless communication link using the second frequency channel;

receiving, by the streaming media device using the second frequency channel, third video data from the media transmitting device via the first wireless communication link; and receiving, by the streaming media device using the second frequency channel, second data from the remote control device via the third wireless communication link.

14. The computer-implemented method of claim 10, further comprising, prior to receiving the first instruction:

receiving, by the streaming media device, a request for a signal strength value corresponding to the second wireless communication link, the request originating from the media transmitting device;

determining, by the streaming media device, the signal strength value; and sending, by the streaming media device using the first frequency channel, the signal strength value to the media transmitting device via the first wireless communication link.

15. The computer-implemented method of claim 10, further comprising:

receiving, by the streaming media device using the first frequency channel, the first video data from the media transmitting device via the first wireless communication link;

determining, by the streaming media device, at least one of a resolution of the first video data is below a first threshold or a throughput associated with the first wireless communication link is below a second threshold;

sending, by the streaming media device using the first frequency channel, an indication to the media transmitting device via the first wireless communication link, the indication indicating that at least one of the resolution of the first video data is below the first threshold or the throughput is below the second threshold; and receiving, by the streaming media device using the first frequency channel, the first instruction from the media transmitting device via the first wireless communication link.

16. The computer-implemented method of claim 10, further comprising:

determining, by the streaming media device, at least one of a resolution of the second video data is below a first threshold or a throughput associated with the second wireless communication link is below a second threshold;

sending, by the streaming media device using the second frequency channel, an indication to the media transmitting device via the wireless access point device, the indication indicating that at least one of the resolution of the first video data is below the first threshold or the throughput is below the second threshold;

receiving, by the streaming media device using the second frequency channel, a third instruction from the wireless access point device via the second wireless communication link, the third instruction originating from the media transmitting device and instructing the streaming media device to connect to the media transmitting device via the first wireless communication link using a third frequency channel;

determining, by the streaming media device, that the third frequency channel is different than the second frequency channel;

sending, by the streaming media device using the second frequency channel, a fourth instruction to the remote device via the third wireless communication link, the fourth instruction instructing the remote device to connect to the streaming media device via the third wireless communication link using the third frequency channel;

receiving, by the streaming media device using the third frequency channel, third video data from the media transmitting device via the first wireless communication link; and receiving, by the streaming media device using the third frequency channel, second data from the remote device via the third wireless communication link.

17. A computer-implemented method comprising:

receiving, by a streaming media device, first video data from an access point device via a wired communication link;

receiving, by the streaming media device using a first frequency channel, first data from a remote device via a first wireless communication link;

receiving, by the streaming media device, a first instruction from the access point via the wired communication link, the first instruction originating from a media transmitting device and instructing the streaming media device to connect to the media transmitting device via a second wireless communication link using a second frequency channel;

determining that the second frequency channel is different than the first frequency channel;

sending, in response to determining that the second frequency channel is different than the first frequency channel, by the streaming media device using the first frequency channel, a second instruction to the remote device via the first wireless communication link, the second instruction instructing the remote device to connect to the streaming media device via the second frequency channel;

receiving, by the streaming media device using the second frequency channel, second video data from the media transmitting device via the second wireless communication link; and receiving, by the streaming media device using the second frequency channel, second data from the remote device via the first wireless communication link.

18. The computer-implemented method of claim 17, further comprising:

receiving, by the streaming media device using the second frequency channel, a third instruction from the media transmitting device via the second wireless communication link, the third instruction instructing the streaming media device to connect to the access point device via the wired communication link;

receiving, by the streaming media device, third video data from the access point via the wired communication link; and receiving, by the streaming media device using the second frequency channel, third data from the remote device via the first wireless communication link.

19. The computer-implemented method of claim 17, further comprising:

receiving, by the streaming media device using the second frequency channel, a third instruction from the media transmitting device via the second wireless communication link, the third instruction instructing the streaming media device to connect to the access point device via the wired communication link;

determining, by the streaming media device, to communicate with the remote device using the first frequency channel;

sending, by the streaming media device using the second frequency channel, a fourth instruction to the remote device via the first wireless communication link, the fourth instruction instructing the remote device to connect to the streaming media device via the first wireless communication link using the first frequency channel;

receiving, by the streaming media device, third video data from the access point via the wired communication link; and receiving, by the streaming media device using the first frequency channel, third data from the remote device via the first wireless communication link.

20. The computer-implemented method of claim 17, further comprising, prior to receiving the first instruction:

receiving, by the streaming media device, the first video data from the access point device via the wired communication link, the first video data originating from the media transmitting device;

determining, by the streaming media device, at least one of a resolution of the first video data is below a first threshold or a throughput associated with the wired communication link is below a second threshold; and sending, by the streaming media device to the media transmitting device via the access point device, an indication that at least one of the resolution of the first video data is below the first threshold or the throughput is below the second threshold.

* * * * *